United States Patent
Ma et al.

(10) Patent No.: US 7,583,755 B2
(45) Date of Patent: Sep. 1, 2009

(54) SYSTEMS, METHODS, AND APPARATUS FOR MITIGATION OF NONLINEAR DISTORTION

(75) Inventors: Xiaoqiang Ma, Newtown, PA (US); Azzedine Touzni, Doylestown, PA (US)

(73) Assignee: ATI Technologies, Inc., Markham (CA)

( * ) Notice: Subject to any disclaimer, the term of this patent is extended or adjusted under 35 U.S.C. 154(b) by 618 days.

(21) Appl. No.: 11/261,614

(22) Filed: Oct. 31, 2005

(65) Prior Publication Data
US 2007/0098090 A1    May 3, 2007

Related U.S. Application Data

(60) Provisional application No. 60/707,535, filed on Aug. 12, 2005.

(51) Int. Cl.
*H04L 27/00* (2006.01)
(52) U.S. Cl. .................................................. 375/316
(58) Field of Classification Search ................. 375/260, 375/316, 324, 335, 340, 346, 349
See application file for complete search history.

(56) References Cited

U.S. PATENT DOCUMENTS

| | | | |
|---|---|---|---|
| 6,240,282 B1 * | 5/2001 | Kleider et al. ........... | 455/226.1 |
| 6,882,217 B1 | 4/2005 | Mueller | |
| 7,139,336 B2 * | 11/2006 | Nefedov ..................... | 375/341 |
| 7,373,168 B1 * | 5/2008 | Kumar ....................... | 455/522 |

| | | | |
|---|---|---|---|
| 2001/0015954 A1 | 8/2001 | Kuwabara | |
| 2004/0208254 A1 | 10/2004 | Lee | |
| 2005/0135324 A1 | 6/2005 | Kim | |
| 2005/0176436 A1 * | 8/2005 | Mantravadi et al. ......... | 455/450 |

FOREIGN PATENT DOCUMENTS

WO    WO03/001689 A2    1/2003

OTHER PUBLICATIONS

Armstrong, J. Peak-to-average power reduction in digital television transmitters. DICTA2002 conf., Melbourne, Jan. 2002. pp. 19-24.
Armstrong, J. Peak-to-average power reduction for OFDM by repeated clipping and frequency domain filtering. Electronics Letters, v. 38, n. 5, Feb. 28, 2002, pp. 246-247.
Bahai, A. et al. A New Approach for Evaluating Clipping Distortion in Multicarrier Systems. IEEE J. on Sel. Areas in Comm., v. 20, n. 5, Jun. 2002, pp. 1037-1046.
Behravan A. et al. Baseband Compensation Techniques for Bandpass Nonlinearities. Proc. IEEE VTC, Fall 2003, Orlando, FL, Oct. 2003, 5 pp.
Chen, H. et al. Iterative Estimation and Cancellation of Clipping Noise for OFDM Signals. IEEE Comm. Let., v. 7, n. 7, Jul. 2003, pp. 305-307.

(Continued)

*Primary Examiner*—Sam K Ahn
(74) *Attorney, Agent, or Firm*—Volpe and Koenig, P.C.

(57) ABSTRACT

A method among the embodiments includes calculating a value of a parameter of a nonlinear model of a signal as transmitted into a transmission channel, and applying the calculated value to obtain an estimate of data values carried by the signal. Applications to multicarrier signals are described.

25 Claims, 21 Drawing Sheets

OTHER PUBLICATIONS

Dardari, D. et al. Analytical Evaluation of Total Degradation in OFDM Systems with TWTA or SSPA. Tech. Rep. CSITE-03-99, IEIIT-Bologna, May 1999, pp. 0-9.

Eslami, M. et al. Performance of OFDM receivers in presence of nonoinear power amplifiers. Proc. IEEE Int. Conf. Comm. Sys., ICCS 2002, Singapore, pp. 219-223.

Gregorio, F. et al. The performance of OFDM-SDMA systems with power amplifier non-linearities. Proc. 2005 Finn. Sig. Proc. Symp., FINSIG'05, Aug. 25, 2005, pp. 58-61.

Kim, D. et al. Clipping Noise Mitigation for OFDM by Decision-Aided Reconstruction. IEEE Comm. Let., v. 3, n. 1, Jan. 1999, pp. 4-6.

Santamaria, I. et al. Modeling Nonlinear Power Amplifiers in OFDM Systems from Subsampled Data. EURASIP J. on Appl. Sig. Proc. 2003:12, pp. 1219-1228.

Tellado, J. et al. Maximum-Likelihood Detection of Nonlinearly Distorted Multicarrier Symbols by Iterative Decoding. IEEE Trans. Comm., v. 51, n. 2, Feb. 2003, pp. 218-228.

Van Den Bos, C. et al. Effect of Smooth Nonlinear Distortion on OFDM Symbol Error Rate. IEEE Trans. Comm., v. 49, n. 9, Sep. 2001, pp. 1510-1514.

Yi, S.-J. et al. Prediction of a CDMA Output Spectrum Based on Intermodulation Products of Two-Tone Test. IEEE Trans. Microwave T. T., v. 49, n. 5, May 2001, pp. 938-946.

Zhidkov, S. et al. Performance Analysis of Multicarrier Systems in the Presence of Smooth Nonlinearity. EURASIP J. Wireless Comm. Net. 2004:2, pp. 335-343.

Saleh, A.A.M. Frequency-Independent and Frequency-Dependent Nonlinear Models of TWT Amplifiers. IEEE Trans. Comm., v. COM-29, n. 11, Nov. 1981, pp. 1715-1720.

Ghadam, A.S.H. et al. Adaptive Compensation of Nonlinear Distortion in Multicarrier Direct-Conversion Receivers. IEEE 2004 Radio and Wireless Conf., Sep. 2004, pp. 35-38.

Dardari, D. A Novel Low Complexity Technique to Reduce Nonlinear Distortion Effects in OFDM Systems. 9th IEEE Int'l Symp. PIM Radio Comm., Boston, MA, 1998, pp. 795-800.

Gorokhov, A. et al. Robust OFDM receivers for dispersive time varying channels: equalisation and channel acquisition. IEEE ICC 2002, New York, NY, pp. 470-474.

Int'l Search Report for Int'l appl. No. PCT/IB2006/003070 and Written Opinion of ISA. European Patent Office, mailed Mar. 13, 2007, 12 pp.

* cited by examiner

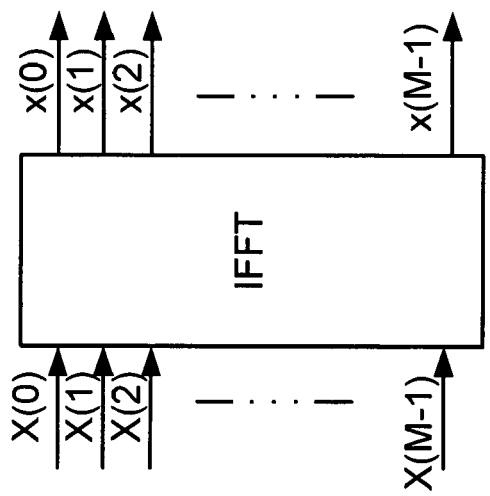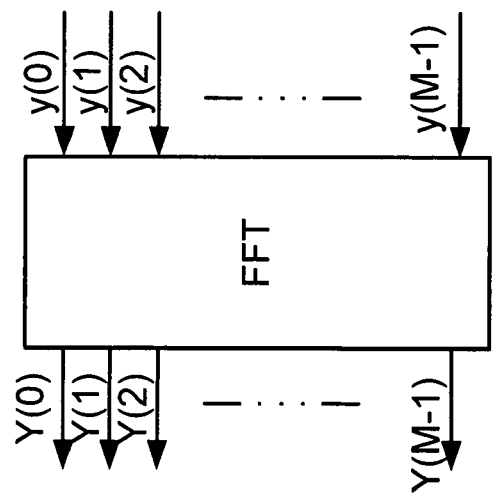

US 7,583,755 B2

SYSTEMS, METHODS, AND APPARATUS FOR MITIGATION OF NONLINEAR DISTORTION

RELATED APPLICATIONS

This application is related to U.S. patent application Ser. No. 11/124,131, entitled "SYSTEMS, METHODS, AND APPARATUS FOR PHASE NOISE MITIGATION," filed May 9, 2005, and to U.S. Provisional Patent Application No. 60/707,535, entitled "SYSTEMS, METHODS, AND APPARATUS FOR IMPULSE NOISE MITIGATION," filed Aug. 12, 2005.

FIELD OF THE INVENTION

This invention relates to wireless communications.

BACKGROUND

Multicarrier technology has been applied or tested in many different fields of communications, ranging from terrestrial uses to satellite communications, and from home networking to broadcast television transmission. Potential advantages of such technology include increased throughput and greater bandwidth utilization. One spectrally efficient form of multicarrier technology—orthogonal frequency division multiplexing (OFDM)—is already in common use in such varied applications as digital audio broadcasting (DAB), digital terrestrial television broadcasting (DVB-T or ISDB-T), digital television broadcasting for handheld devices (DVB-H), terrestrial and handheld digital multimedia broadcasting (DMB-T/H), digital subscriber line (DSL) for high-bit-rate digital subscriber services on twisted pair channels, and wireless networking under such standards as IEEE 802.11 and 802.16.

A multicarrier system design may be selected from among several different configurations. For example, a single-input, single-output (SISO) system transmits one multicarrier signal, while a multiple-input, multiple-output (MIMO) system transmits multiple multicarrier signals over the same band and includes antenna arrays at the transmitter and receiver. The modulation scheme to be applied may also be selected from among many different design options. Typically a phase-shift keying (PSK) scheme is used, such as quadrature PSK (QPSK), quadrature amplitude modulation (QAM), or offset QAM (OQAM). Typical QAM schemes include 4-, 16-, 64-, 256-, and 1024-QAM.

One example of an OFDM application, Terrestrial Digital Video Broadcast or "DVB-T," is specified in the European Telecommunications Standards Institute document EN 300 744. The DVB-T specification provides for a 2K mode (with 1705 subcarriers spaced about 4.5 kHz apart) and an 8K mode (with 6817 subcarriers spaced about 1.1 kHz apart), with the multicarrier signal being transmitted over a bandwidth of 5, 6, 7, or 8 MHz. The related handheld specification (DVB-H) also provides for a 4K mode (with 3409 subcarriers). Modulation schemes used in a DVB system may include QPSK, 16-QAM, and/or 64-QAM.

Accurate channel estimation is an important factor in obtaining a low bit-error rate for a multicarrier system. Channel estimation becomes especially important in situations where the channel may be time-varying, such as mobile applications.

An OFDM system typically includes one or more power amplifiers in the radio-frequency signal path. It is desirable to select such an amplifier in accordance with general design criteria of small size and low power consumption. Unfortunately, an OFDM signal typically has large envelope fluctuations, manifested as a high peak-to-average power ratio (PAPR). Such a signal may drive a power amplifier to operate outside its linear range, causing nonlinearity in the amplified signal. Typical approaches to the problem of nonlinearity in OFDM signals include predistortion of the signal before transmission.

SUMMARY

A method of signal processing according to an embodiment includes estimating, based on a signal received over a transmission channel, a response of the transmission channel; and calculating, based on the estimated response of the transmission channel, a first estimate of a set of data values carried by the received signal. The method also includes calculating, based on the first estimate, a value of a parameter of a nonlinear model of the signal; and calculating, based on the value of the parameter, a second estimate of the set of data values.

An apparatus according to an embodiment includes a channel estimator configured to estimate, based on a signal received over a transmission channel, a response of the transmission channel; and a first signal estimator configured to calculate, based on the estimated response of the transmission channel, a first estimate of a set of data values carried by the received signal. The apparatus also includes a parameter estimator configured to calculate, based on the first estimate, a value of a parameter of a nonlinear model of the signal; and a second signal estimator configured to calculate, based on the value of the parameter, a second estimate of the set of data values.

BRIEF DESCRIPTION OF THE DRAWINGS

FIGS. 2A and 2B show inputs and outputs of an inverse FFT operation and an FFT operation, respectively.

FIG. 11 shows a diagram of a cubic model for varying a.

FIG. 12 shows a four-quadrant diagram of a cubic model for varying a.

FIG. 13 shows a diagram of a quintic model for varying a.

DETAILED DESCRIPTION

In the following description, the symbol j is used in two different ways. In some instances, the symbol j denotes the imaginary square root of −1 (as in $e^{j\Phi(i)}$). In other instances, the symbol j is used to indicate an index, such as a column of a matrix (as in $W_{ij}$). Both usages are common in the art, and one of skill will recognize which one of the two is intended from the context in which each instance of the symbol j appears.

In the following description, an underscore is used to indicate a vector (as in $\underline{h}$), and bold face is used to indicate a matrix (as in W). Vectors and matrices in the time domain are labeled in lower case (as in $\underline{h}$), and vectors and matrices in the frequency domain are labeled in upper case (as in W).

Unless expressly limited by its context, the term "obtaining" is used to indicate any of its ordinary meanings, including computing, calculating, measuring, estimating, receiving (e.g. from an external device), and retrieving (e.g. from a storage element). Unless expressly limited by their contexts, the term "calculating" includes, in addition to its ordinary meanings, selecting a value (e.g. from a list or table) according to a result of a computation or other calculation, and the term "calculated value" includes, in addition to its ordinary meanings, a value that is selected (e.g. from a list or table) according to a result of a computation or other calculation.

Figure 1:
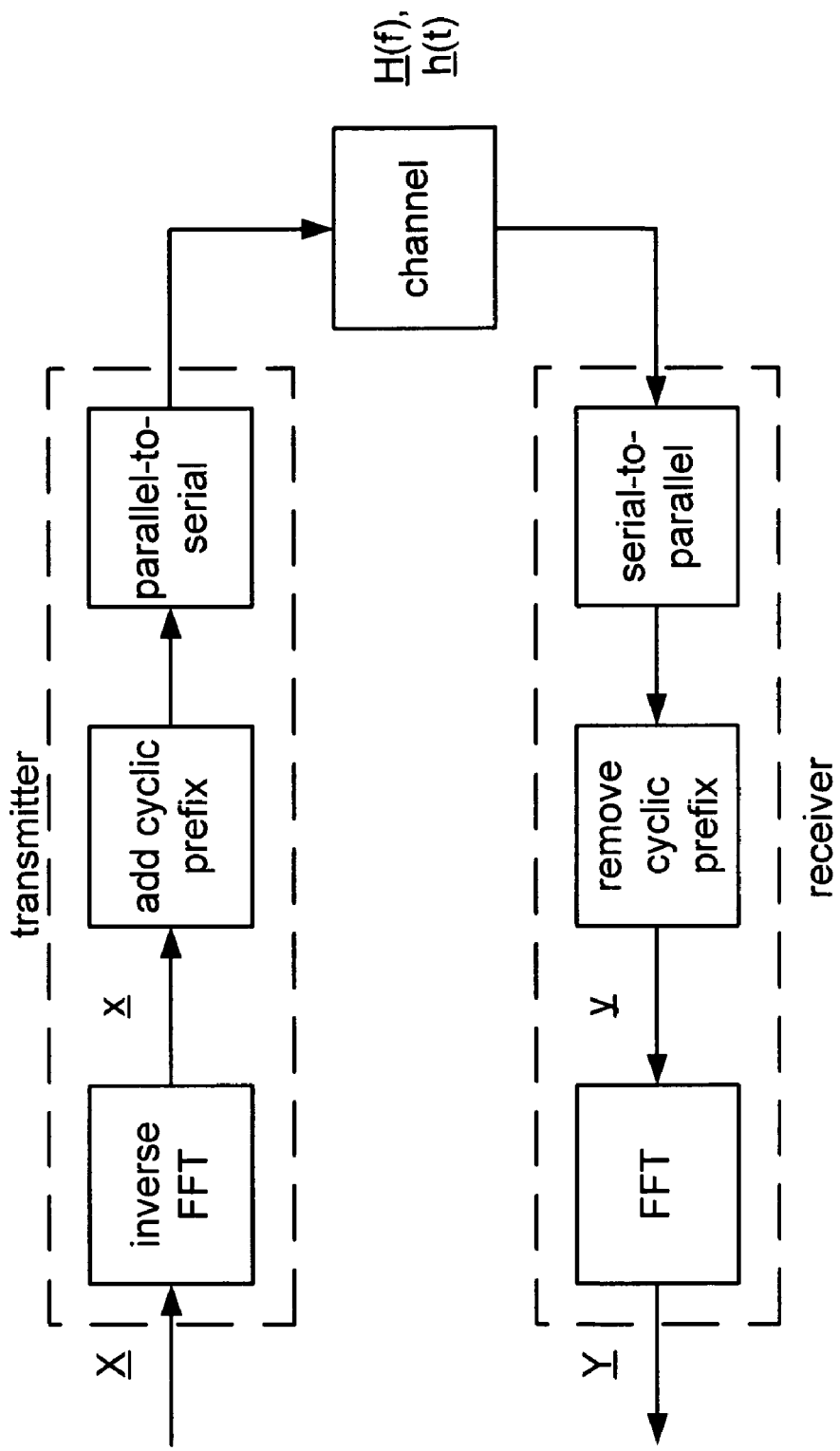
FIG. 1 is a block diagram showing an example of an OFDM system.

FIG. 1 shows a block diagram of a representative OFDM system. The transmitter receives a symbol X having M complex values, each representing a data value modulated onto a corresponding one of M subcarriers. The data values may be derived from one serial data stream, such as a television or other high-bandwidth signal. Alternatively, the data values may be derived from more than one (up to M) different data streams, as in a multiple-access system. In addition to data values corresponding to user traffic, the data values may also include one or more pilot signals whose values are a deterministic function of time and/or frequency (based on a known pseudorandom sequence, for example). The symbol X may also include null values interspersed among the data values and/or clustered apart from the data values (e.g. at values corresponding to carriers at the lowest and/or highest ends of the frequency range).

The subcarriers may be modulated according to a scheme such as m-ary PSK (e.g. QPSK) or m-ary QAM (e.g. 16-QAM or 64-QAM). The modulation scheme may vary from one subcarrier to another, as such variation may increase capacity or reduce bit-error rate under some constraints. Error detection, error correction, and/or redundancy coding operations, such as encoding, puncturing, and/or interleaving, may already have been performed on the data values prior to modulation.

As depicted in FIG. 2A, the transmitter applies an inverse fast Fourier transform or FFT (of at least M points) to the symbol X to obtain a corresponding complex time-domain sequence x. The transmitter may also insert a guard interval between symbols to reduce intersymbol interference. Typically, the transmitter inserts this interval by cyclic extension of the sequence x. For example, the transmitter may append a copy of the last N bits of the sequence x to the start of the sequence as a cyclic prefix, where the length N of the cyclic prefix is selected to be at least as large as the expected length L of the channel impulse response. A DVB transmitter may be configured to apply a guard interval of $\frac{1}{32}$, $\frac{1}{16}$, $\frac{1}{8}$, or $\frac{1}{4}$ of the length of the sequence. Either before or after the guard interval is inserted, the time-domain sequence is serialized for transmission. More than one such transmitter may be present in a MIMO system.

Figure 3:
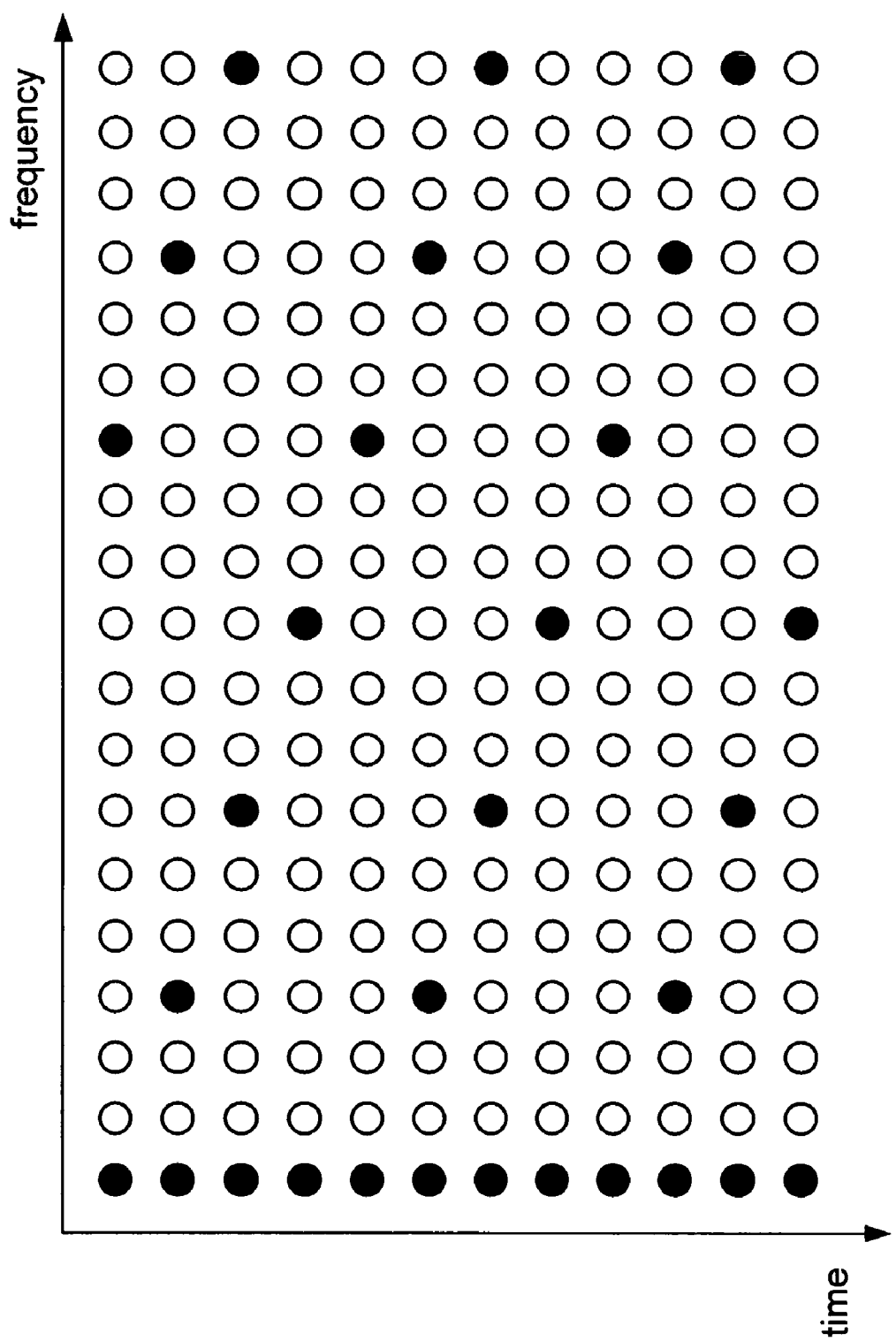
FIG. 3 is a diagram depicting a portion of a pilot scheme including a continuous pilot and scattered pilots.

Some of the M subcarriers may be reserved to carry a pilot signal. Typically the pilot signals form a pattern of data values that may be known a priori at the receiver. The pilot carrier assignments may be distributed across the frequency range, such that the channel response may be sampled across the bandwidth of the transmission. The carrier assignment scheme may be fixed or may vary over time. The DVB specifications provide for a scheme that includes continuous pilots, in which a carrier is modulated with a pilot signal during each symbol, and scattered pilots, in which a carrier is modulated with a pilot signal during some symbols and with a traffic signal during other symbols. FIG. 3 shows one example of such an assignment scheme, in which open circles represent traffic channels and filled circles represent pilot channels. In this example, the scattered pilots occur at intervals of twelve carriers in frequency and according to a pattern that is staggered by three carriers from one symbol to the next and has a period of four symbols in time.

Effects of the transmission channel may include random noise (e.g. additive white Gaussian noise) and multipath fading. The channel effects are modeled as a function h of time and/or as a function H of frequency. At the receiver, the signal is parallelized and the cyclic extension is removed. The resulting time-domain signal y is converted (e.g. using an FFT) to the received frequency-domain symbol Y, as depicted in FIG. 2B. The symbol Y is equalized to obtain an estimate of the transmitted symbol X. Further processing may include demodulation and decoding.

As compared to a single-carrier system, a multicarrier system such as an OFDM system may exhibit reduced ISI and increased robustness to multipath effects. Orthogonality of consecutive symbols over time is maintained by inserting a guard interval such as a cyclic extension (e.g. prefix). OFDM systems also tend to have a relatively flat frequency response across each narrow subchannel. However, an OFDM system may become more sensitive to loss of orthogonality of the carriers (e.g. crosstalk) as the number of subchannels increases.

It may be desirable to support reception of multicarrier or OFDM signals in mobile applications ranging from low-mobility portable devices to on-board vehicle equipment. For example, it may be desirable to support reception of DVB signals in a mobile environment. The channel response may be expected to vary over time in a mobile application, such that channel estimation becomes more important and also more difficult.

As noted above, the received OFDM signal may include nonlinear distortion introduced, for example, by one or more power amplifiers in the signal path. It is desirable to compensate for nonlinear distortion in the received signal.

In the absence of nonlinearity, a multicarrier signal as received over one symbol period may be modeled in the time domain as a function of the transmitted symbol, the channel response, and a random noise process:

$$y(k) = \sum_{l=0}^{L-1} h_l x(k-l) + n(k), \quad 0 \le k \le M-1, \quad (1.1)$$

where y(k) denotes the signal as received at time i, h(l) denotes the channel impulse response at delay l, x(k) denotes the time-domain transmitted signal at time k, n(k) denotes a value of a random noise process at time k, M denotes the number of subbands, and L denotes the length of the channel impulse response. The random noise process $\underline{n}$ may be assumed to have Gaussian statistics with zero mean and variance $\sigma^2$.

In the frequency domain, the model of expression (1.1) may be expressed as $$\underline{Y} = H\underline{X} + \underline{N}, \quad (1.2)$$

where column vector $\underline{Y}$ denotes the frequency transform of $\underline{y}$; column vector $\underline{X}$ denotes the frequency transform of $\underline{x}$; column vector $\underline{N}$ denotes the frequency transform of $\underline{n}$; and H is a diagonal matrix whose diagonal is the vector $W_L \underline{h}$, where the (M×L) matrix $W_L$ is a frequency transform matrix. The frequency transform used will typically be the discrete Fourier transform (DFT), which may be implemented using any of the various fast Fourier transform (FFT) methods.

In one example, the matrix $W_L$ is the first L columns of the (M×M) DFT matrix W, whose elements are defined as $$W_{ij} = e^{-j2\pi \frac{ij}{M}}, \quad (1.3)$$

where the indices i and j, $0 \le i,j \le M-1$, denote row and column, respectively. The transform operation may include a scaling factor of 1/M. Alternatively, this factor may be applied in the inverse transform operation instead or may be split between the two operations (e.g. each of the transform and inverse transform operations being scaled by $1/\sqrt{M}$). The vector $W_L \underline{h}$ may also be expressed as the M-element column vector $\underline{H}$. (As will be understood from the context, a notation $\underline{H}$ may also be used herein to denote a channel estimate vector having fewer than M elements.)

Figure 4:
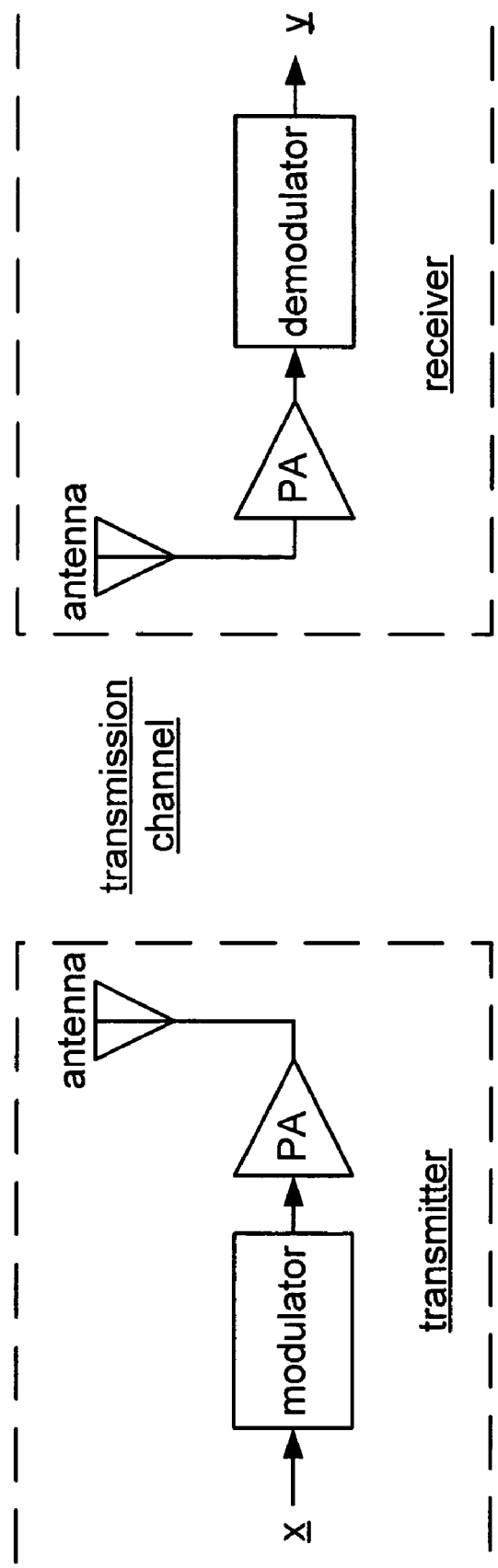
FIG. 4 is a block diagram depicting an example of a portion of a signal path in a system including power amplifiers.

In expressions (1.1) and (1.2), the transmission channel is modeled as a linear time-invariant system of length L. However, the signal as transmitted into the channel may be corrupted by nonlinear distortion. For example, the transmission path between baseband signal $\underline{x}$ and baseband signal $\underline{y}$ may include devices whose response is nonlinear. Power amplifiers typically have responses that are significantly nonlinear, especially when operated in conditions of high dynamic range as may be found in OFDM applications. As shown in the example of FIG. 4, power amplifiers are typically used in the RF path at the transmitter (for example, to transmit the signal into the antenna), and power amplifiers may also be used in the RF path at the receiver. The signal path may also include one or more filters before and/or after each amplifier.

Nonlinear models have been developed to represent distortions introduced by physical devices. Many commonly used nonlinear devices, such as limiters and high-power amplifiers (HPAs), may be modeled as memoryless nonlinear devices, in which the output at time t is not dependent on past inputs or outputs.

In modeling the response of such a device or portion of the system, it may be convenient to represent the complex continuous-time information signal in polar coordinates as $x = \rho e^{j\phi}$, where $\rho$ denotes amplitude and $\phi$ denotes phase. The nonlinear response may be represented generally as g(•), such that the complex envelope of the output signal is modeled as $$g(x) = F(\rho) e^{j(\phi + \Phi(\rho))}, \quad (2.1)$$

where $F(\rho)$ represents the amplitude modulation to amplitude modulation (AM/AM) conversion characteristic of the memoryless nonlinearity, and $\Phi(\rho)$ represents the amplitude modulation to phase modulation (AM/PM) conversion characteristic of the memoryless nonlinearity.

Examples of nonlinear models include a model ("the Rapp model") that has been found to approximate the nonlinear response of a solid-state power amplifier (SSPA). The conversion characteristics of the Rapp model may be expressed as follows:

$$F(\rho) = \frac{\rho}{\left(1 + \left(\frac{\rho}{A}\right)^{2p}\right)^{\frac{1}{2p}}}, \quad \Phi(\rho) = 0, \quad (2.2)$$

where the parameter p controls the smoothness of the transition from the linear region to the limiting (or saturation) region, and A denotes the output voltage at the saturation point. Under this model, the phase of the signal is not affected.

Figure 5:
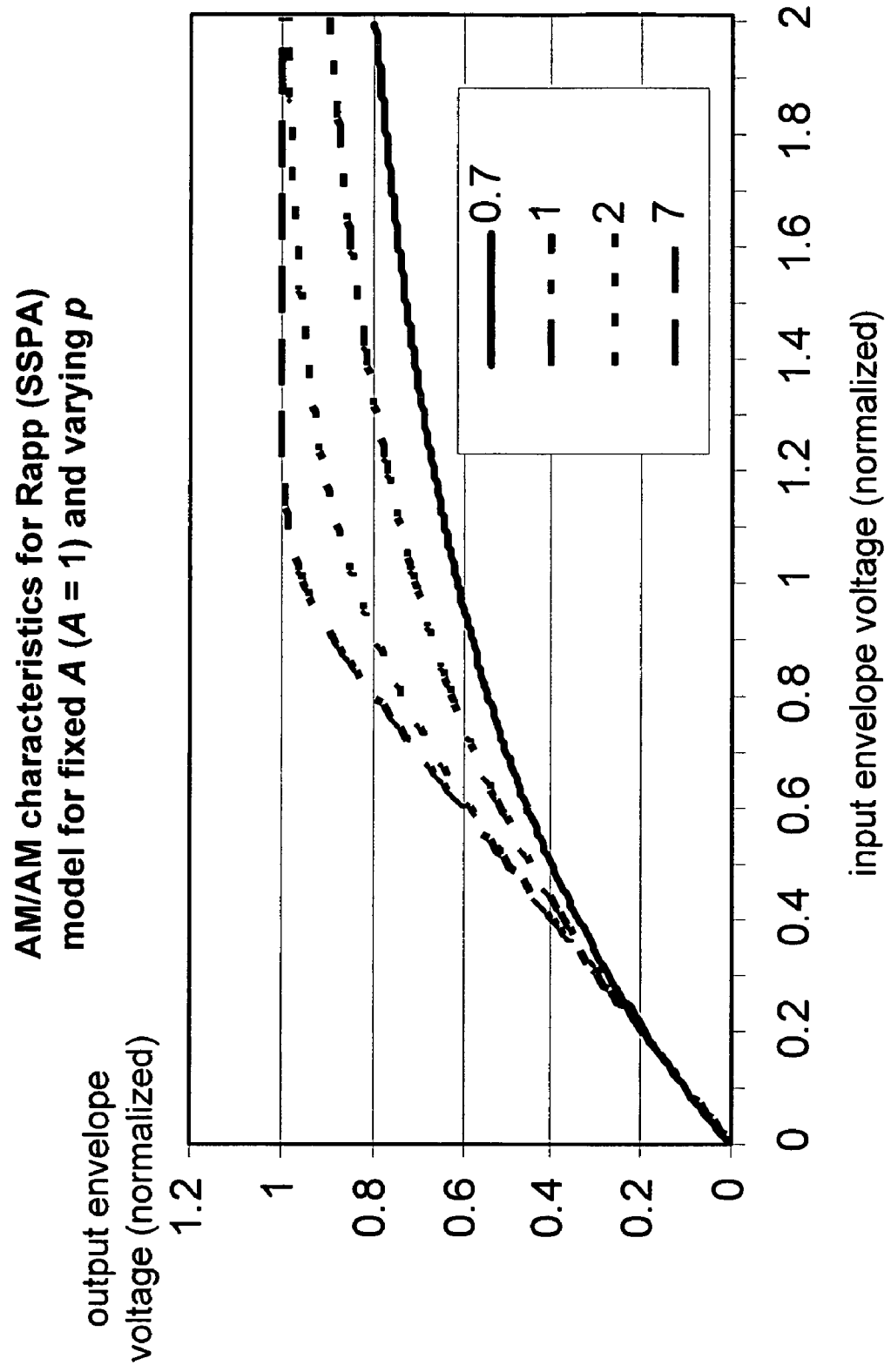
FIG. 5 shows a diagram of a SSPA model for constant A and varying p.
Figure 6:
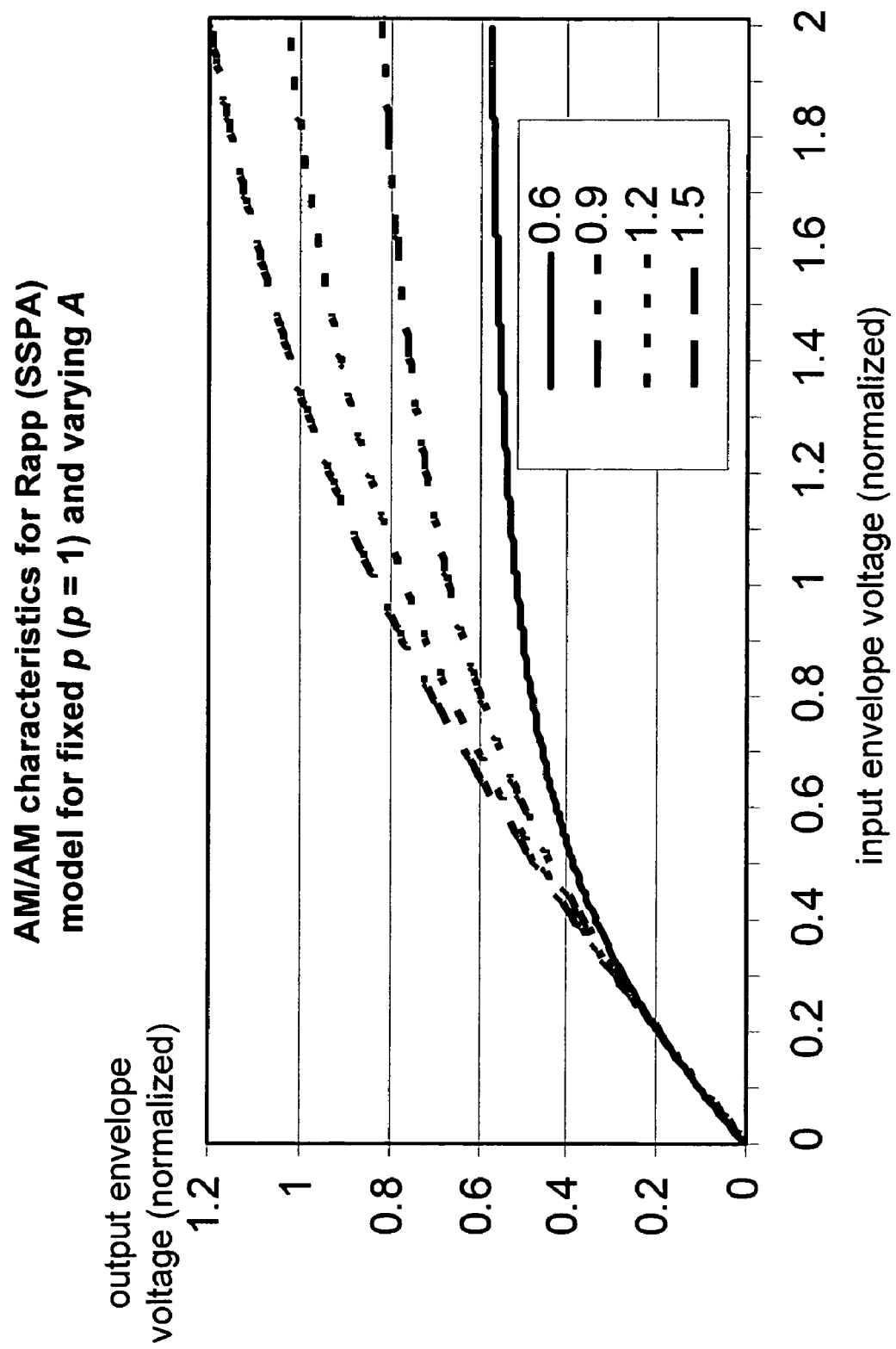
FIG. 6 shows a diagram of a SSPA model for constants and varying A.

FIG. 5 shows plots of the AM/AM conversion characteristic of the Rapp model for several different values of smoothness factor p (with the value of the output saturation voltage A fixed at 1). FIG. 6 shows plots of the AM/AM conversion characteristic of the Rapp model for several different values of output saturation voltage A (with the value of the smoothness factor p fixed at 1).

Figure 7:
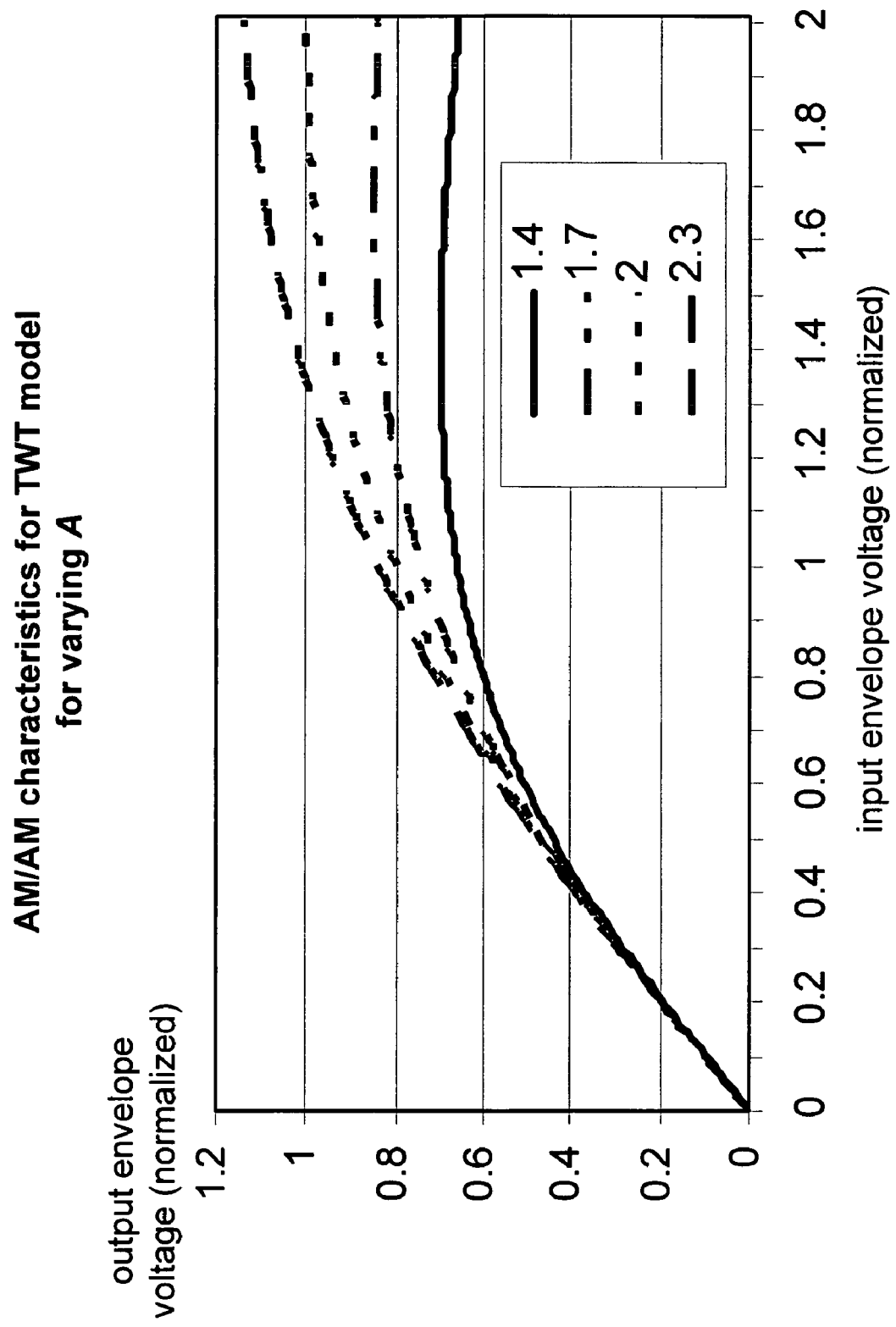
FIG. 7 shows a diagram of AM/AM characteristics of a TWT model for varying A.
Figure 8:
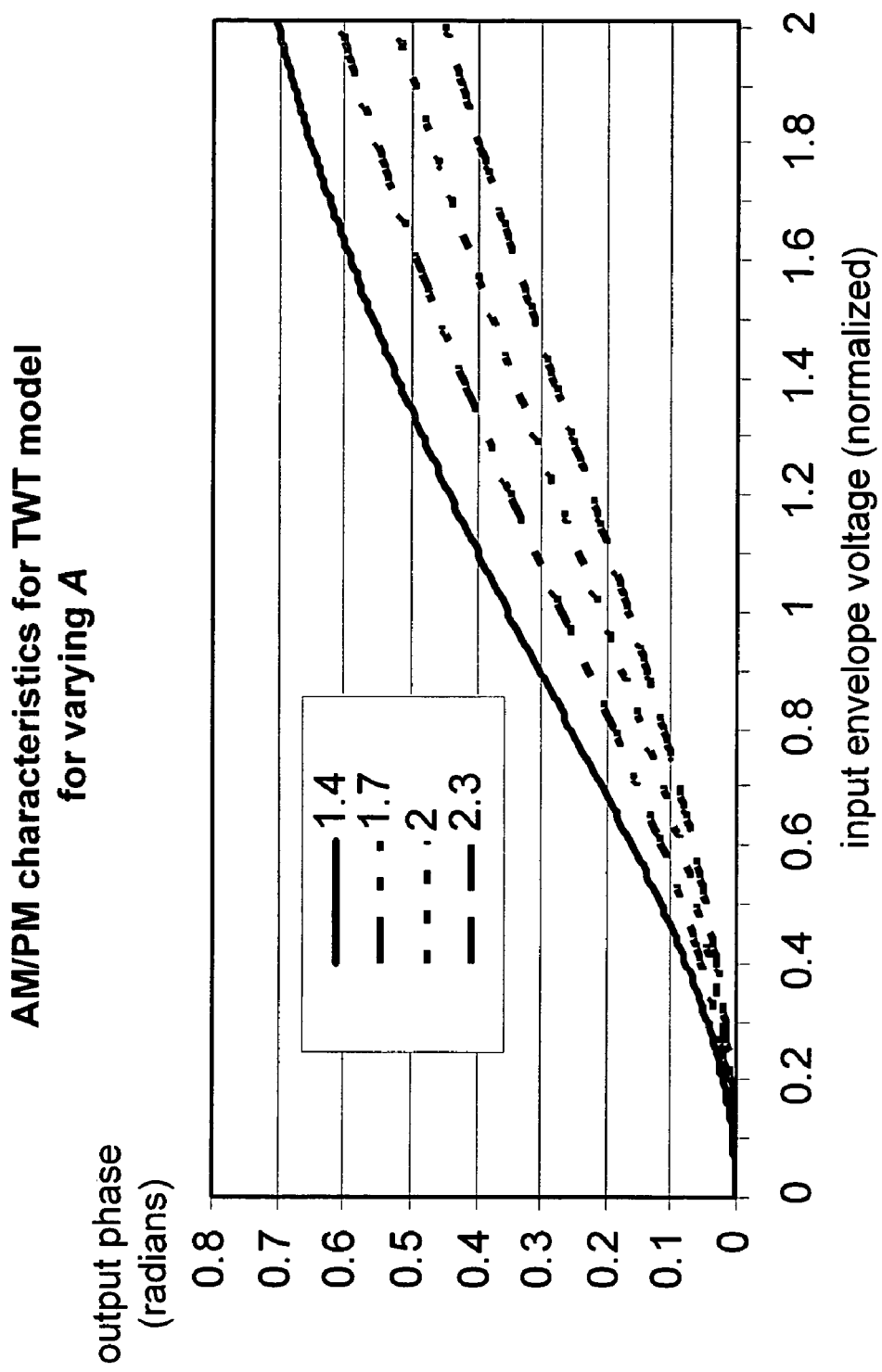
FIG. 8 shows a diagram of AM/PM characteristics of a TWT model for varying A.

Another type of model ("the TWT model") has been found to approximate the nonlinear response of a traveling-wave tube (TWT) amplifier. Such amplifiers are commonly used in satellite communication systems. The conversion characteristics of this model may be expressed as follows:

$$F(\rho) = \frac{\rho}{1 + \left(\frac{\rho}{A}\right)^2}, \quad \Phi(\rho) = \frac{\pi}{3} \frac{\rho^2}{\rho^2 + A^2}, \quad (2.3)$$

where A denotes the amplifier input saturation voltage. As compared to the Rapp model, the amplitude distortion is generally more severe for the TWT model for the same saturation voltage, and the signal also suffers a phase distortion under this model. FIGS. 7 and 8 show plots of the AM/AM and AM/PM conversion characteristics, respectively, of the TWT model for several different values of input saturation voltage A.

In another TWT model ("the Saleh model"), the conversion characteristics are expressed as follows:

$$F(\rho) = \frac{\alpha_a \rho}{1 + \beta_a \rho^2}, \quad \Phi(\rho) = \frac{\alpha_\phi \rho^2}{1 + \beta_\phi \rho^2}. \quad (2.4)$$

Figure 9:
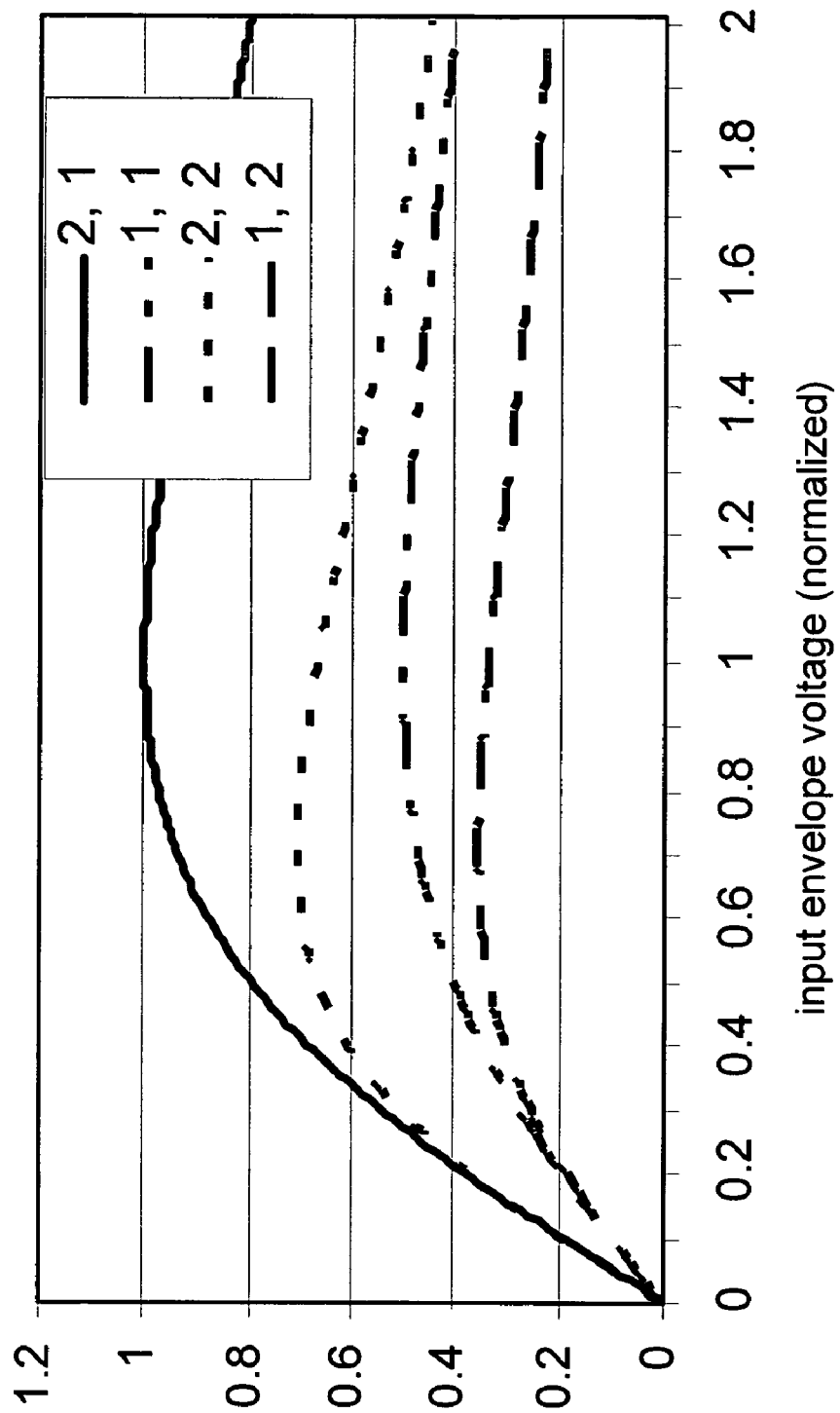
FIG. 9 shows a diagram of AM/AM characteristics of another TWT model for varying ($\alpha_a$, $\beta_a$).
Figure 10:
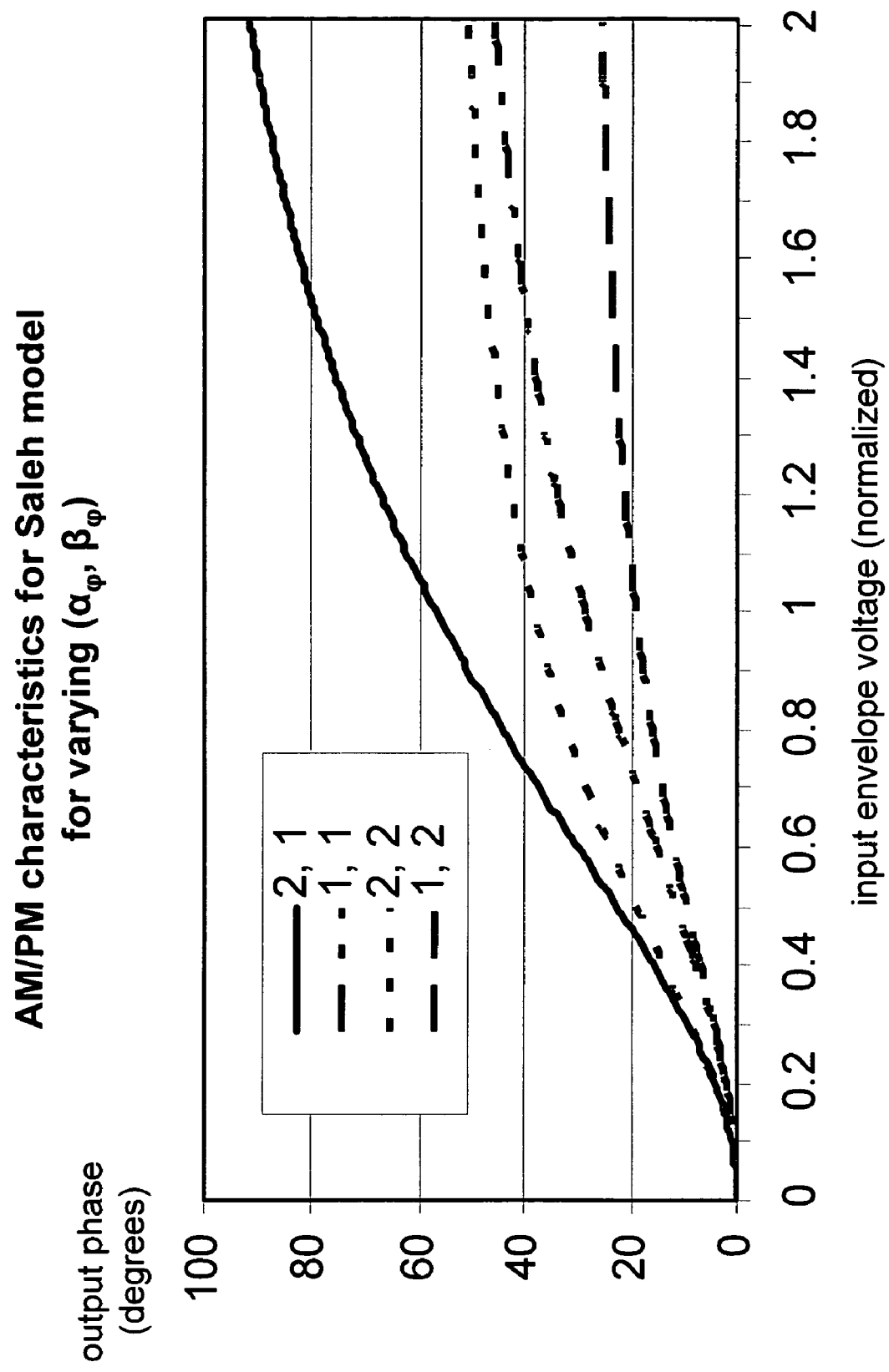
FIG. 10 shows a diagram of AM/PM characteristics of the other TWT model for varying ($\alpha_\varphi$, $\beta_\varphi$).

Examples of the AM/AM and AM/PM conversion characteristics of this model are shown in FIGS. 9 and 10, respectively.

One example of a set of parameters that has been found to provide a good approximation to observed TWT amplifier responses is the set $\{\alpha_a, \beta_a, \alpha_\phi, \beta_\phi\} = \{2.1587, 1.1517, 4.033, 9.1040\}$.

In the presence of a nonlinearity in the signal as transmitted into the transmission channel, the time-domain model of expression (1.1) may be modified as follows:

$$y(k) = \sum_{l=0}^{L-1} h_l g(x(k-l)) + n(k), \quad 0 \leq k \leq M-1, \quad (3.1)$$

where $g(x(k))$ denotes the complex envelope of the signal as transmitted into the channel at time k. If the envelope $g(x)=F(\rho)e^{j(\phi+\Phi(\rho))}$ is smooth, then it may be modeled using a Taylor series expansion.

Embodiments include methods, systems, and apparatus that evaluate one or more parameters of a nonlinear model of the signal as transmitted. For example, the complex envelope $g(x)$ of the signal as transmitted into the channel may be modeled as the sum of a linear term and at least one nonlinear term. Such examples include N-order polynomial models of the form $$g(x) = \sum_{i=0}^{N-1} c_i x^i,$$

where the model is characterized by the parameters $c_i$. A model of this form may be incorporated into the model of expression (3.1) as $$g(x(k)) = \sum_{i=0}^{N-1} c_i x(k)^i.$$

Figure 11:
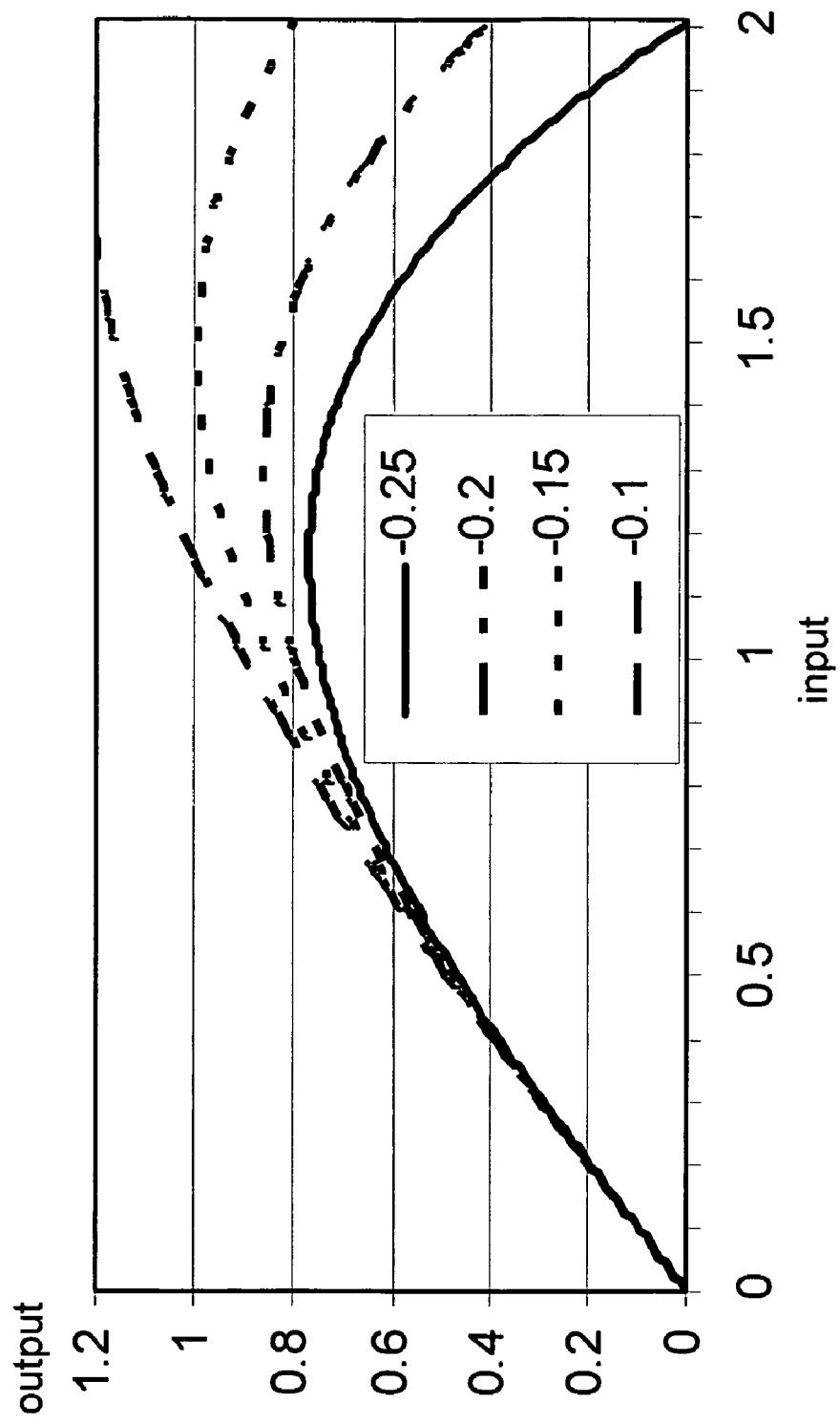
Figure 12:
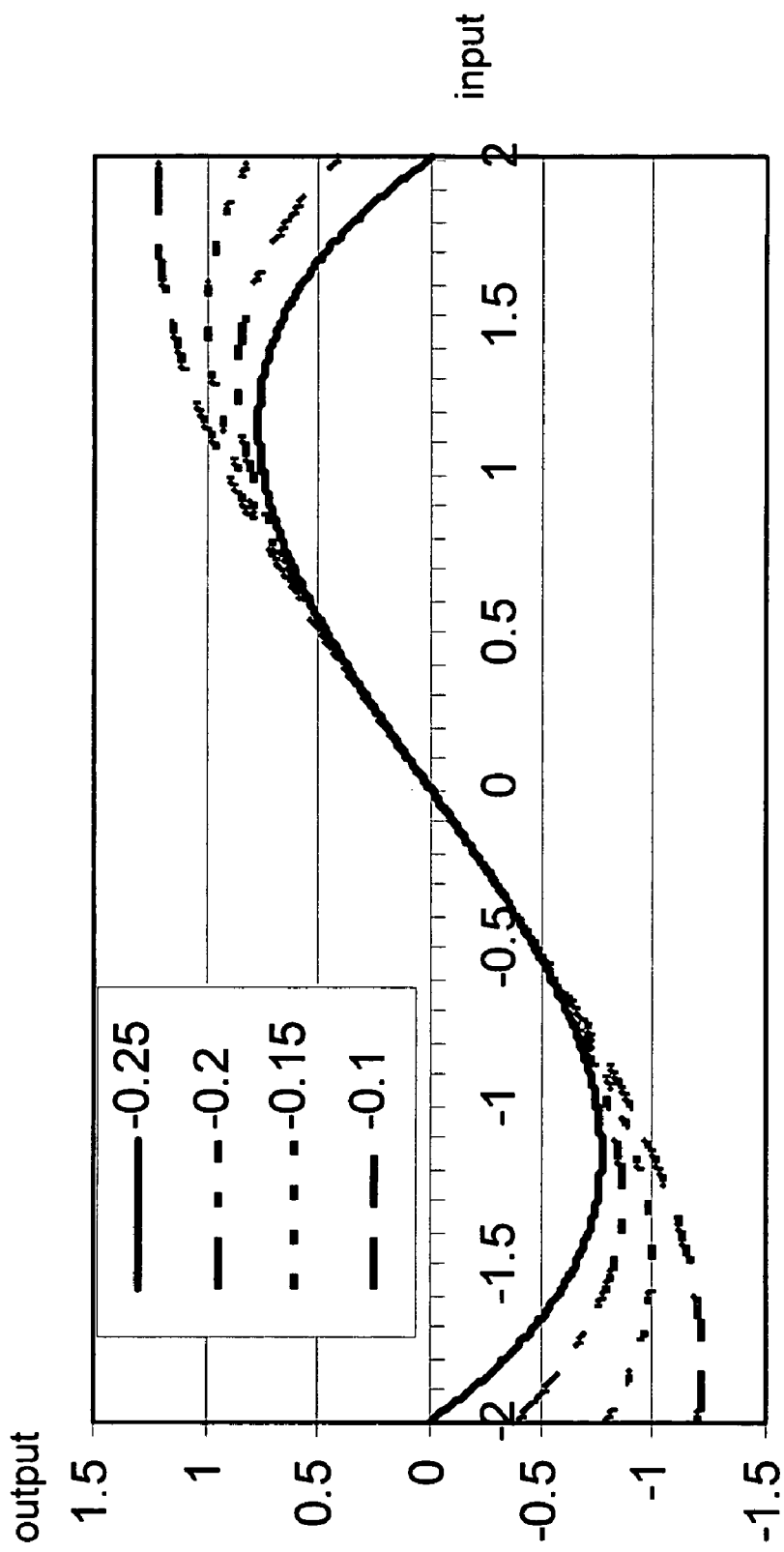

In one example as described herein, the function $g(x)$ is represented as the cubic binomial $g(x)=x+ax^3$, where $$a = \frac{c_3}{c_1}$$

and $c_0, c_2 = 0$. FIG. 11 shows examples of the response of this cubic model for values of coefficient a ranging from −0.1 to −0.25. The four-quadrant version of this chart in FIG. 12 illustrates how the use of an odd power in the expansion preserves the sign of the model's input.

Figure 13:
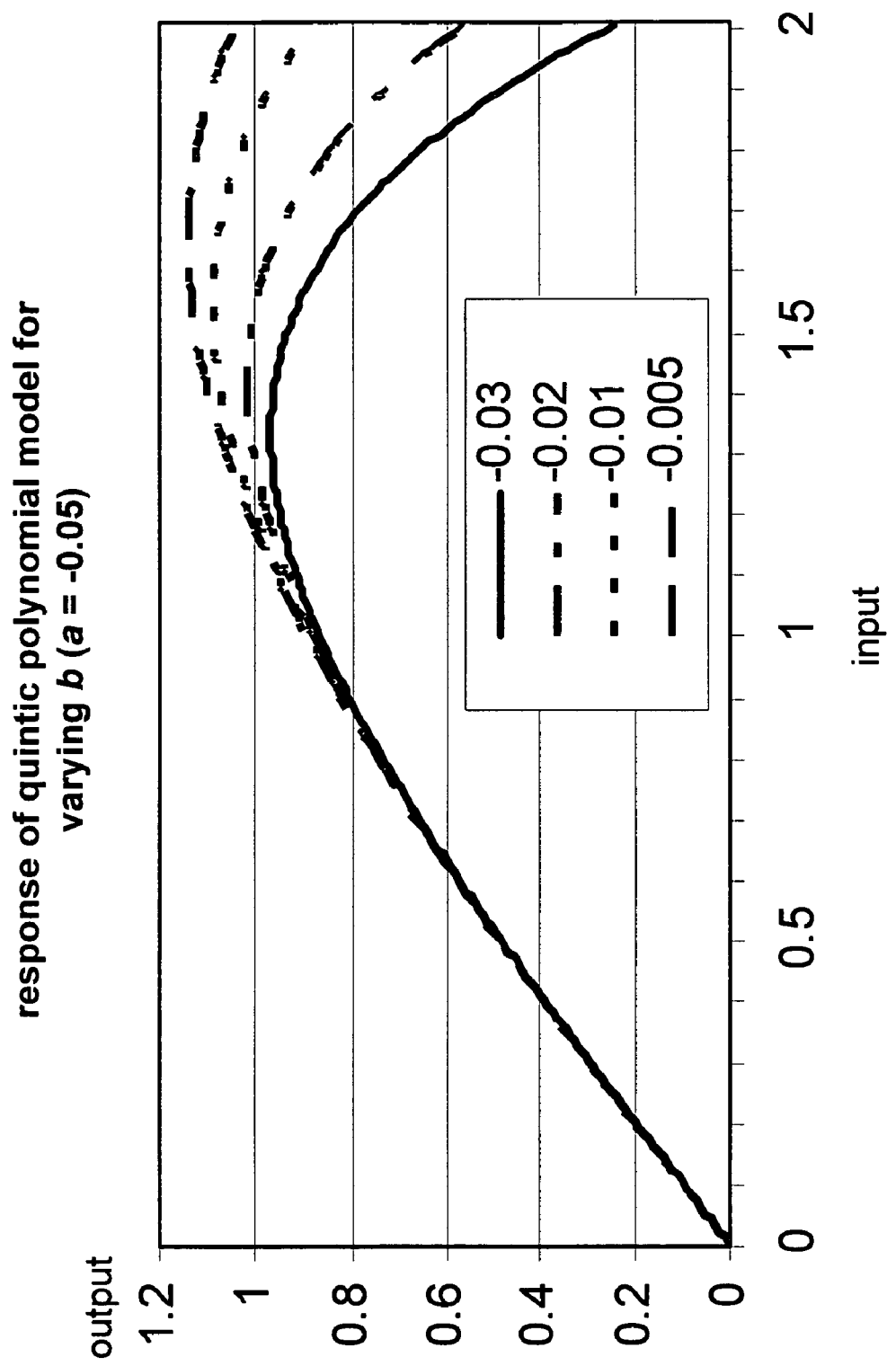

The cubic expansion above has been found to provide good results with relatively low complexity of both computation and implementation, but the expansion of $g(x)$ may be extended to any number of terms. For example, FIG. 13 shows examples of the response of a quintic expansion model $g(x) = x+ax^3+bx^5$ for several values of coefficient b (with the value of coefficient a fixed at −0.05 for this example).

Applying the model $g(x)=x+ax^3$ to expression (3.1) yields the following time-domain expression:

$$y(k) = \sum_{l=0}^{L-1} h_l x(k-l) + a \sum_{l=0}^{L-1} h_l [x(k-l)]^3 + n(k). \quad (3.2)$$

In the presence of a nonlinearity in the signal as transmitted into the transmission channel, where the signal as transmitted is modeled using the cubic expansion $g(x)=x+ax^3$, the frequency-domain model of expression (1.2) may be modified as follows:

$$\underline{Y} = \underline{HX} + a\underline{HX_3} + \underline{N}, \quad (3.3)$$

where column vector $\underline{X_3}$ denotes the frequency transform of column vector $\underline{x_3} = \text{diag}(\underline{x})\text{diag}(\underline{x})\text{diag}(\underline{x})$ (i.e. $x_3(k) = [x(k)]^3$). Embodiments include methods, systems, and apparatus configured to estimate a value of the model parameter a, based on an estimated response of the transmission channel.

Figure 14B:
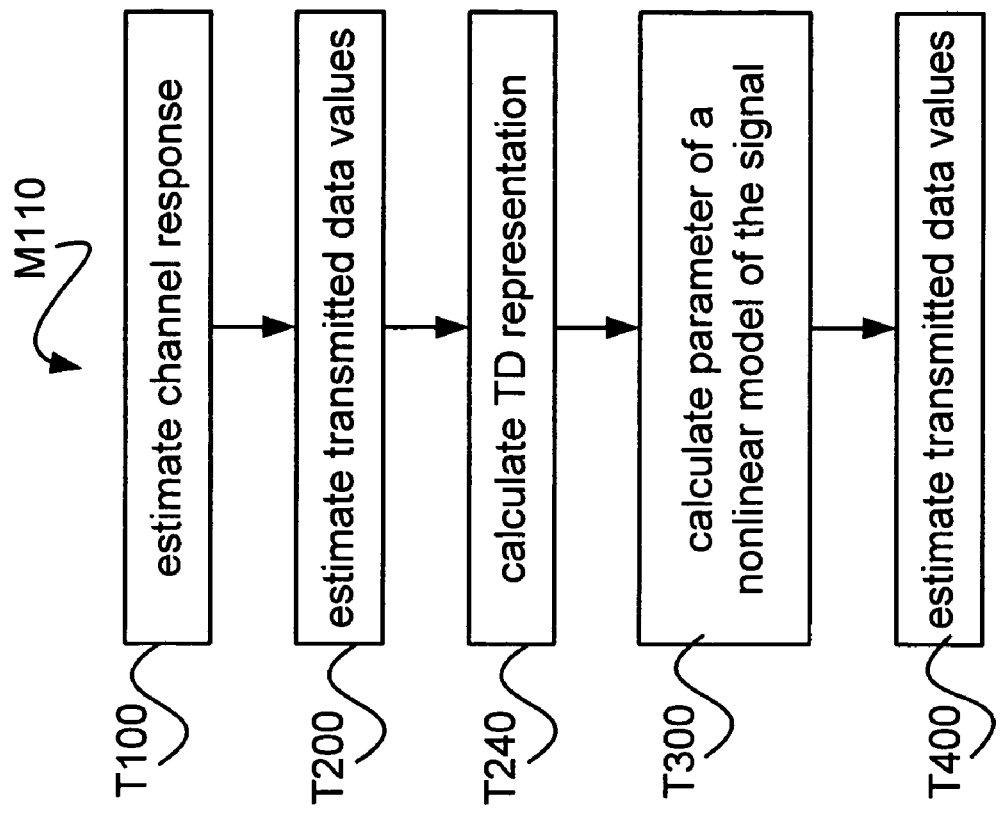
FIG. 14B shows a flowchart of an implementation M110 of method M100.
Figure 14A:
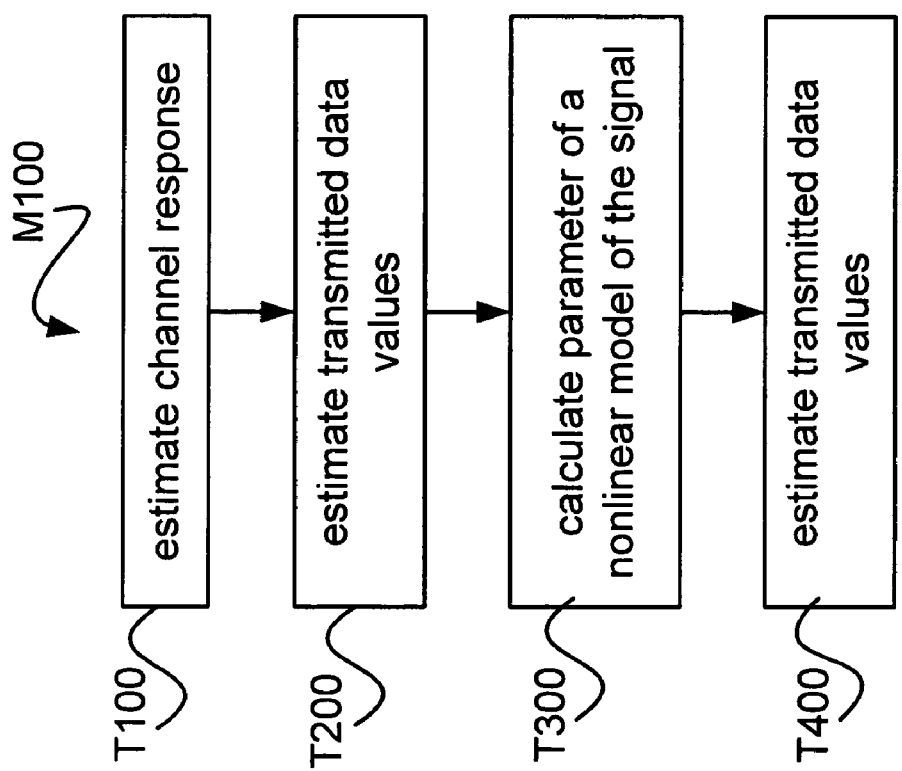
FIG. 14A shows a flowchart of a method M100 according to an embodiment.

FIG. 14A shows a flowchart for a method M100 according to an embodiment. Based on the received signal, task T100 obtains an estimated response of the transmission channel $\underline{H}^{(0)}$. Especially in a first iteration, this initial response may be inaccurate. For example, the received signal may contain nonlinear distortion which has not yet been corrected.

For an application in which known values (such as pilot signals) are transmitted over some set P of the subcarriers, knowledge of those components of $\underline{X}$ may be used to obtain an estimated channel response $\underline{H}_P^{(0)}$ over at least those subcarriers. Of the various parameters in the models of expressions (3.1)-(3.3), the received signal is known, such that the estimated channel response may also be based on at least one received symbol. In one implementation, task T100 obtains an estimate $\underline{H}_P^{(0)}$ of the response of the transmission channel according to the following expression:

$$H_P^{(0)}(k) = \begin{cases} Y(k)/X(k), & k \in P \\ 0, & \text{otherwise} \end{cases}, \quad (4.1)$$

$k = \{0, 1, 2, \ldots, M-1\}$, where the values of $X(k)$ for $k \in P$ are known a priori. The estimated channel response at elements of $\underline{H}^{(0)}$ that are not in set P (for example, traffic carriers) may be interpolated from nearby non-zero values of $\underline{H}_P^{(0)}$ and/or from values of an estimated response of the channel during one or more preceding and/or subsequent periods (e.g. symbol periods). These and other methods and structures for channel estimation are described herein, and task T100 may be implemented to perform any such method or to otherwise obtain (for example, from storage or from another device) an estimated channel response as calculated by any such method.

As noted above, pilot signals may be distributed across the range of subcarriers in time and/or frequency. In some applications, null carriers may be used with or instead of pilot signals. Although this description primarily uses the example of pilot signals in reference to known transmitted values, it should be understood that prior knowledge of transmitted values due to other data structures (such as packet headers) or time-based activities (such as synchronization sequences) may also be applied in estimating channel responses.

Based on the estimated channel response, task T200 estimates a set of data values carried by the received signal. For example, task T200 may be configured to estimate the transmitted symbol $\underline{X}$. In one such configuration, task T200 performs a least-squares operation according to the following expression:

$$X^{(0)}(k) = \frac{Y(k)}{H^{(0)}(k)}. \tag{4.2}$$

(Values of $X^{(0)}(k)$ for $k \in P$ need not be estimated, or may be calculated for verification.) The operation described by expression (4.2) is also called a one-tap equalization. In further or alternate implementations, task T200 may be configured to estimate the transmitted symbol X based on one or more of any of the following that are known and/or estimated: values of elements of $\underline{X}$ within the symbol, values of elements of $\underline{X}$ within one or more other symbols (e.g. symbols received earlier or later than the signal portion currently being estimated), and estimated responses of the transmission channel that relate to states prior or subsequent to a period corresponding to the estimated response $\underline{H}^{(0)}$. Task T200 may also be implemented to perform an equalization operation of more than one tap.

Based on the data values estimated in task T200, task T300 calculates at least one value of a parameter of a nonlinear model of the signal. For example, task T300 may be configured to calculate a value of a parameter of a model of the signal as transmitted (e.g. into the transmission channel) or as received (e.g. by an FFT block or other receiver element). For an application in which the nonlinear model $g(x)=x+ax^3$ is used, task T300 may be configured to calculate the coefficient a of the model's nonlinear term $ax^3$. Based on the calculated parameter value, task T400 calculates a second estimate of a set of data values carried by the received signal. For example, task T400 may be configured to calculate an estimate $\underline{X}^{(1)}$ of the transmitted symbol $\underline{X}$.

FIG. 14B shows a flowchart of an implementation M110 of method M100. Method M110 includes task T240, which calculates a time-domain representation of the set of data values estimated in task T200. For example, task T240 may be configured to calculate an estimate of the transmitted signal at baseband. Task T240 may calculate the time-domain representation by performing a transform on the estimated transmitted symbol $\underline{X}^{(0)}$. For example, task T240 may be configured to perform an inverse frequency transform on the estimate $\underline{X}^{(0)}$ according to the expression $\underline{x}^{(0)}=\text{IFFT}(\underline{X}^{(0)})$.

Figure 15:
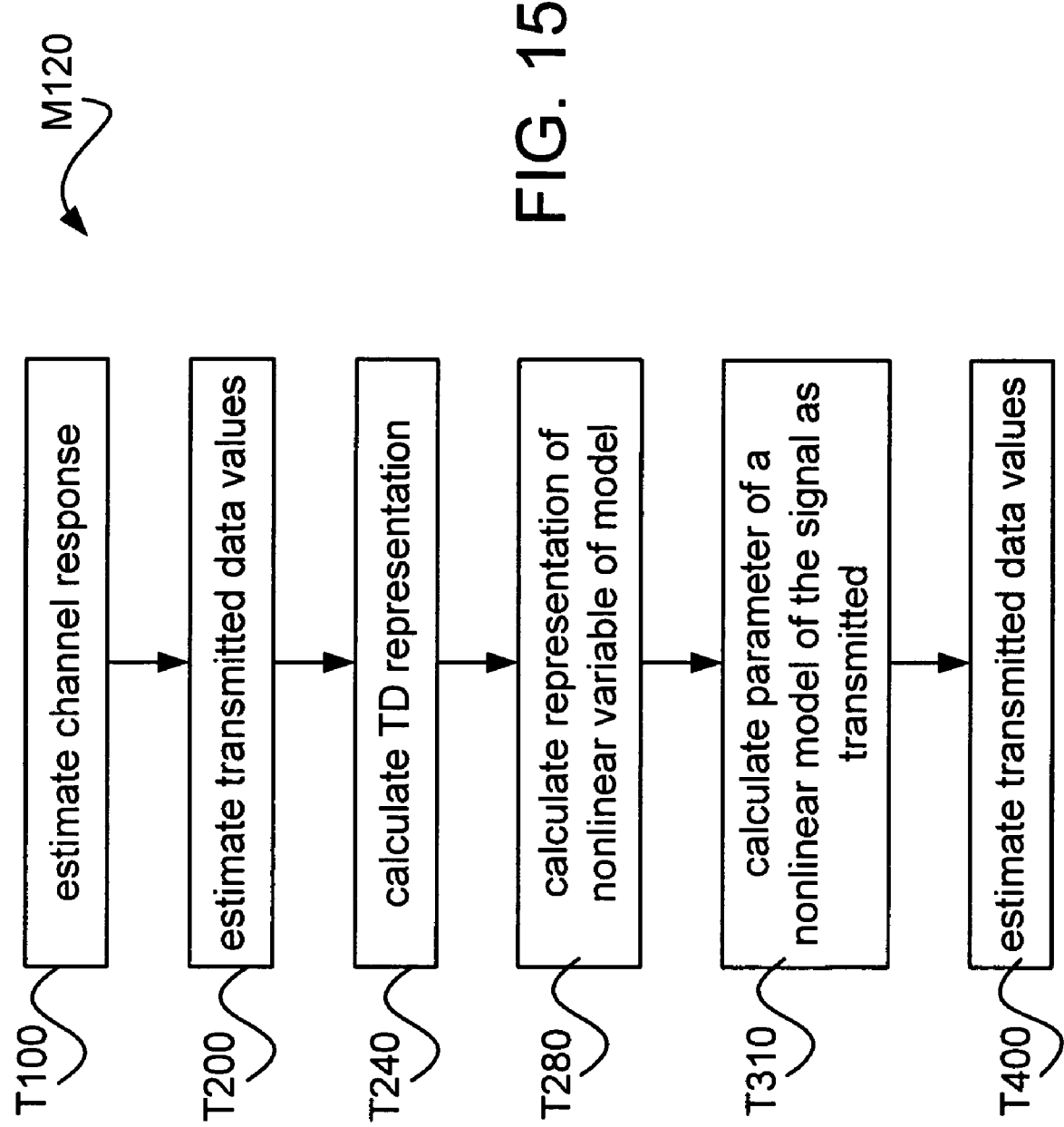
FIG. 15 shows a flowchart of an implementation M120 of method M100.

FIG. 15 shows a flowchart of an implementation M120 of method M100. Method M120 includes task T280, which calculates a representation of a nonlinear variable of the nonlinear model of the signal as transmitted. For example, task T280 may be configured to calculate a representation of a nonlinear variable $x^j$, for $j>1$, of the model $$g(x) = \sum_{i=0}^{N-1} c_i x^i.$$

Task T280 may be configured to calculate the representation as a frequency-domain representation of the time-domain estimate as raised to the power of a nonlinear term of the model of the signal as transmitted. In such case, task T280 may perform the calculation by raising each value of the time-domain representation, as calculated by task T240, to the power of the nonlinear term and converting the raised estimate to the frequency domain. For example, task T280 may be configured to raise the values of the time-domain estimate $\underline{x}$ to the power of the term that includes the parameter to be computed. Such an operation may be performed according to the expression $x_n(k)=[x(k)]^n$, $k=\{0, 1, 2, \ldots, M-1\}$, where n is the power of the nonlinear term that includes the parameter to be computed. For an application in which the nonlinear model $g(x)=x+ax^3$ is used, task T280 may be configured to calculate a raised estimate $\underline{x}_3^{(0)}$ according to the expression $x_3^{(0)}(k)=[x^{(0)}(k)]^3$.

Task T280 may also be configured to perform a frequency transform on the raised estimate $\underline{x}_n$ according to the expression $\underline{X}_n = \text{FFT}(\underline{x}_n)$. For such an implementation in which the nonlinear model $g(x)=x+ax^3$ is used, task T280 may be configured to calculate a frequency-domain representation $\underline{X}_3^{(0)}$ according to the expression $\underline{X}_3^{(0)}=\text{FFT}[(\underline{x}^{(0)})^3]$.

An implementation 310 of parameter calculation task T300 calculates at least one value of a parameter of the nonlinear model of the signal as transmitted. Task T310 may be configured to calculate a value of a coefficient of a nonlinear term of the model. For an application of the model $g(x)=x+ax^3$, for example, task T310 may be configured to calculate a value of the coefficient a. Task T310 may also be configured to calculate a set of estimated values corresponding to a nonlinear variable of the nonlinear model of the signal as transmitted.

In general, task T310 may be configured to calculate a parameter value based on a residual between the data values as received and as expected. In such case, the data values as expected may be based on knowledge of the channel response and of the transmitted values. For example, the residual r for each value p in set P may be expressed as the difference between the data value as received, $Y(p)$, and the data value as expected based on the corresponding channel estimate and known value, $H^{(0)}(p)X(p)$:

$$r(p)=Y(p)-H^{(0)}(p)X(p). \tag{4.3}$$

Task T310 may also be configured to normalize the residual r based on a representation of a nonlinear variable of the nonlinear model. For example, task T310 may be configured to normalize the residual based on a representation as calculated in task T280. In such case, task T310 may be configured to normalize the residual r for each value p in set P based on the corresponding component of the frequency-domain representation of the raised estimate, as modified by the corresponding channel estimate:

$$a^{(0)}(p) = \frac{r(p)}{H^{(0)}(p)X_3^{(0)}(p)} = \frac{Y(p) - H^{(0)}(p)X(p)}{H^{(0)}(p)X_3^{(0)}(p)}. \tag{4.4}$$

The values of vector $\underline{a}$ may be averaged over set P to provide a single scalar value for the parameter a. For example, task T310 may be configured to calculate a value of the coefficient a according to an expression such as the following:

$$a^{(0)} = \frac{1}{P}\sum_{p \in P} a^{(0)}(p) = \frac{1}{P}\sum_{p \in P} \frac{Y(p) - H^{(0)}(p)X(p)}{H^{(0)}(p)X_3^{(0)}(p)}. \tag{4.5}$$

In a further example, the averaging operation may be configured to exclude values corresponding to pilots that are determined to be corrupted (e.g. by narrowband noise and/or as determined by an error detection coding operation). Other noise-reduction algorithms may also be applied to calculate a scalar value for a.

For a model having more parameters, parameter calculation task T300 may be iterated to estimate the other parameters. For an application in which a higher-order model is used, for example, task T300 may be configured to characterize the model by estimating more than one coefficient. An implementation of task T300 for an application using a quintic model of nonlinearity may be configured to estimate the coefficients of the third-order and fifth-order terms. In one such implementation, task T300 is configured to estimate the coefficient of the third-order term and then to apply that estimate in obtaining the value of the coefficient for the fifth-order term.

Based on the calculated value of the parameter, task T400 calculates a second estimate of a set of data values carried by the received signal. For example, task T400 may be configured to calculate an estimate $\underline{X}^{(1)}$ of the transmitted symbol $\underline{X}$. The second estimate may also be based on the first estimate and/or a representation of a nonlinear variable of the model. For an application of the model $g(x)=x+ax^3$, for example, task T400 may be configured to calculate the second estimate according to an expression such as the following:

$$X^{(1)}(k) = X^{(0)}(k) - a^{(0)}X_3^{(0)}(k) = \frac{Y(k)}{H^{(0)}(k)} - a^{(0)}X_3^{(0)}(k). \quad (4.6)$$

Task T400 may also calculate the second estimate according to a decision operation that selects the best constellation point for each computed element of the second estimate (as computed, for example, according to an expression such as (4.6) or (4.7)). Such a decision operation may also be referred to as quantization or slicing. The set of constellation points from which the selection is made may depend upon the modulation scheme used on the corresponding subcarrier and may differ from one subcarrier to another. In one example, task T400 is configured to select the best constellation point from the corresponding set according to a minimum distance criterion.

In further implementations of method M100, one or more of the tasks may be iterated. For example, expressions describing operations in one such example may be generalized to the (v+1)-th iteration of an iterative implementation as follows:

$$\underline{x}^{(v)} = IFFT[\underline{X}^{(v)}]; \quad (5.1)$$

$$x_3^{(v)}(k) = [x^{(v)}(k)]^3; \quad (5.2)$$

$$\underline{X}_3^{(v)} = FFT[\underline{x}_3^{(v)}]; \quad (5.3)$$

$$a^{(v)} = \frac{1}{P}\sum_{p \in P}\frac{Y(p) - H^{(v)}(p)X^{(v)}(p)}{H^{(v)}(p)X_3^{(v)}(p)}; \quad (5.4)$$

$$\underline{X}^{(v+1)} = \underline{X}^{(v)} - a^{(v)}\underline{X}_3^{(v)}. \quad (5.5)$$

An iterated implementation of method M100 may include obtaining a new estimate $\underline{H}^{(v)}$ of the channel response. For example, such an estimate may be calculated according to an expression such as one of the following:

$$\underline{H}^{(v)} = \frac{\underline{Y}}{\underline{X}^{(v)}}; \quad (5.6)$$

$$\underline{X}_3^{(v)} = FFT\left[(IFFT[\underline{X}^{(v)}])^3\right], H^{(v)}(k) = \frac{Y(k)}{X^{(v)}(k) + a^{(v)}X_3^{(v)}(k)}. \quad (5.7)$$

In an application where the length of the channel response is expected to be much less than the number of subcarriers, such an operation may also include reducing the time-domain length of the channel response estimate via an operation such as filtering or curve-fitting (e.g. using a polynomial or spline interpolation). Different techniques of channel estimation as described herein may be used in different iterations. A channel estimation operation may also be configured to exclude values corresponding to carriers that are determined to be corrupted.

In an iterated implementation, a task of obtaining a new estimate for $\underline{X}$ may also include performing error-correcting decoding and subsequent re-encoding (for example, error detection, error correction, and/or redundancy coding operations, such as encoding, puncturing, and/or interleaving) on an estimate of $\underline{X}$ from the previous iteration.

Estimates of values of the transmitted symbol X may also be corrupted at the receiver. For example, such an estimate may be affected by a nonlinearity of an amplifier of the receiver. As mentioned above, embodiments include implementations of method M100 that are configured to reduce an effect of a nonlinearity in the receiver. Such an implementation of method M100 may apply a model as described in expression (3.2) or (3.3), where the value of parameter a may be expected to be different from a value corresponding to a nonlinearity in the transmitter. Alternatively, such an implementation of method M100 may be configured to apply a nonlinear model of the signal as received. One such model may be expressed in the time domain as follows:

$$y(k) = \sum_{l=0}^{L-1} h_l x(k-l) + a\left[\sum_{l=0}^{L-1} h_l x(k-l)\right]^3 + n(k).$$

Further implementations include models that describe different nonlinearities of both of the transmitter and receiver.

Figure 16:
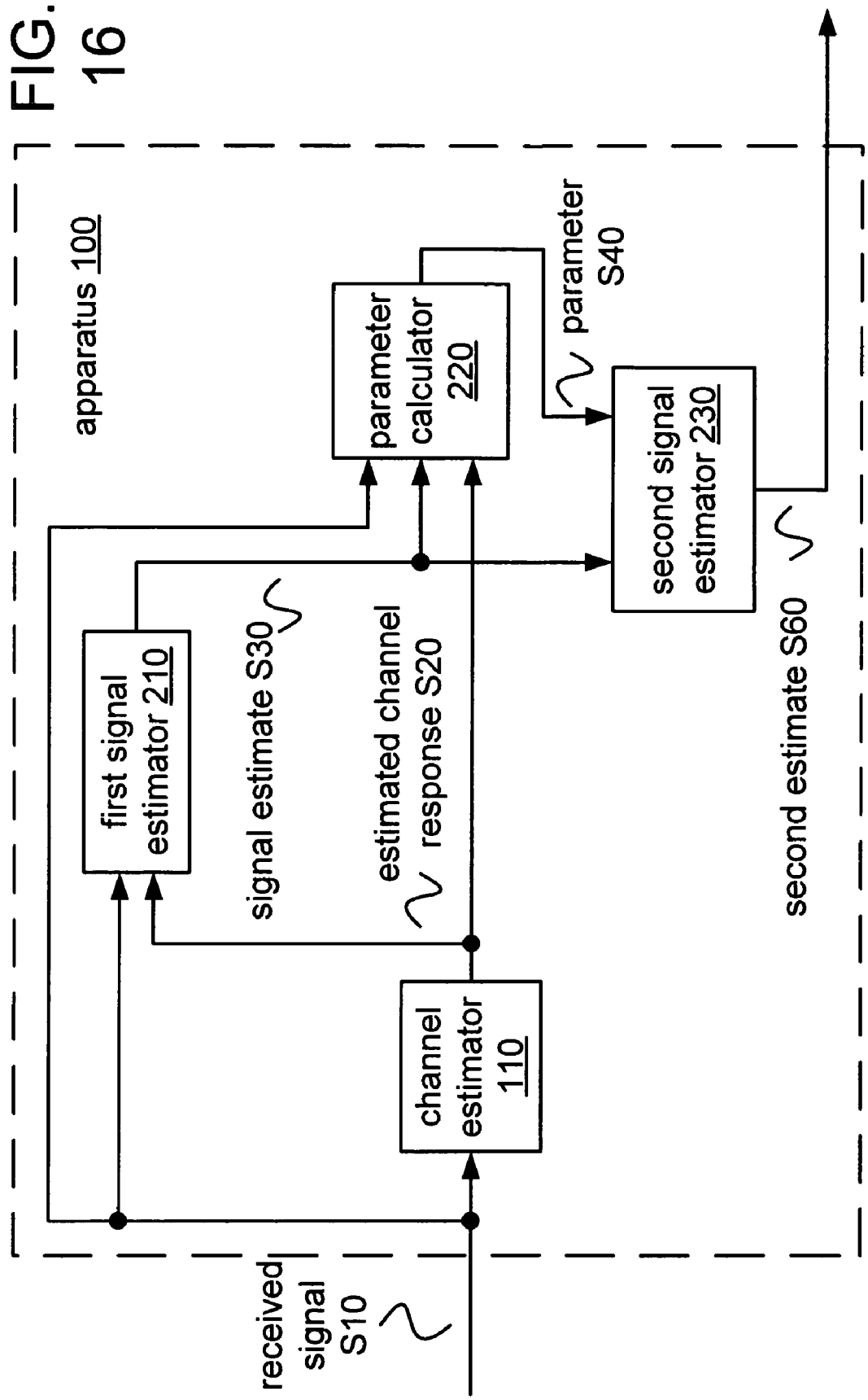
FIG. 16 shows a block diagram of an apparatus 100 according to an embodiment.

FIG. 16 shows a block diagram of an apparatus 100 according to an embodiment that is configured to receive a signal S10 and to produce a corresponding estimate S60 of a set of data values carried by signal S10. Channel estimator 110 is configured to obtain an estimated response S20 of the transmission channel, based on the received signal S10. For example, channel estimator 110 may be configured to perform an implementation of task T100 as disclosed herein.

First signal estimator 210 is configured to calculate a first estimate S30 of a set of data values carried by the received signal. For example, first signal estimator 210 may be configured to perform a least-squares operation on the received signal and the estimated channel response. First signal estimator 210 may include an equalizer (such as a one-tap equalizer) which is configured to calculate the first estimate according to expression (4.2), or may be otherwise configured to perform an implementation of task T200 as disclosed herein.

Parameter estimator 220 is configured to calculate at least one value S40 of a parameter of a nonlinear model of the signal as transmitted into the transmission channel. Parameter estimator 220 may be configured to calculate a parameter value based on a residual between the data values as received and as expected. For example, parameter estimator 220 may be configured to perform an implementation of task T300 as disclosed herein. As described herein, parameter estimator 220 may be configured to calculate more than one value for the parameter (for example, a set of values or a vector). Parameter estimator 220 may also be configured to calculate values for more than one parameter (for example, for more than one nonlinear term of the model).

Second signal estimator 230 is configured to calculate a second estimate S60 of the set of data values, based on signal estimate S30 and parameter value(s) S40. For example, second signal estimator 230 may be configured to perform an implementation of task T400 as disclosed herein.

Elements of apparatus 100 may share structure. For example, a hardware block or set of instructions configured for efficient execution of a particular operation, such as an FFT or IFFT block, may be used by more than one element. One or more elements and/or portions thereof may also be configured as separate elements or processes, such that a system including an instance of apparatus 100 may use such an element or portion even if the apparatus 100 is not currently activated.

The various elements of apparatus 100 may be implemented as electronic and/or optical devices residing, for example, on the same chip or among two or more chips in a chipset, although other arrangements without such limitation are also contemplated. One or more elements of apparatus 100 may be implemented in whole or in part as one or more sets of instructions executing on one or more fixed or programmable arrays of logic elements (e.g. transistors, gates) such as microprocessors, embedded processors, IP cores, digital signal processors, FPGAs (field-programmable gate arrays), ASSPs (application-specific standard products), and ASICs (application-specific integrated circuits). It is also possible for one or more such elements to have structure in common (e.g. a processor used to execute portions of code corresponding to different elements at different times, or an arrangement of electronic and/or optical devices performing operations for different elements at different times). Apparatus 100 may also be implemented to perform iterative calculation of second estimate S60 according to iterative implementations of method M100 as described herein.

Figure 17:
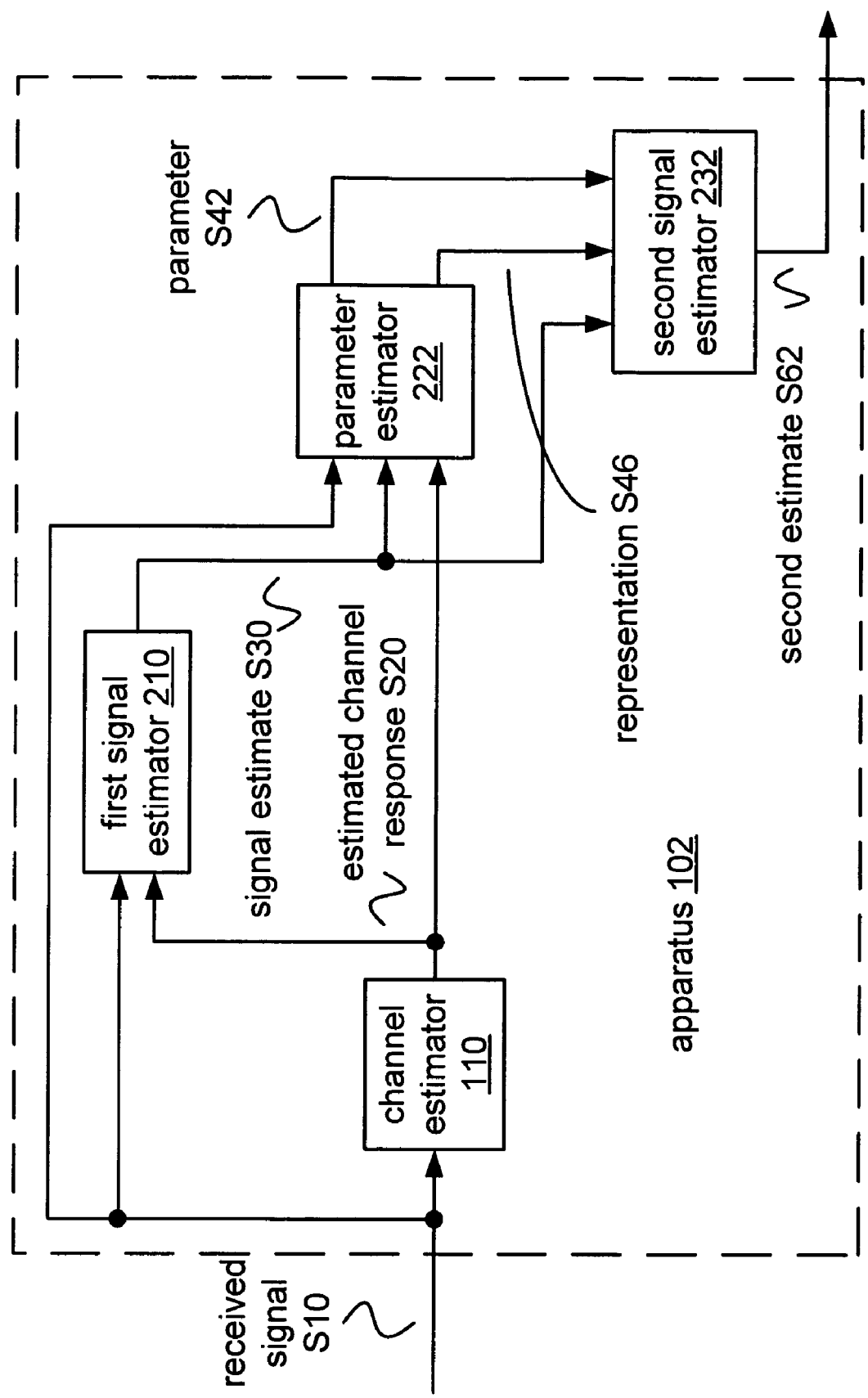
FIG. 17 shows a block diagram of an implementation 102 of apparatus 100.

FIG. 17 shows a block diagram of an implementation 102 of apparatus 100 that includes an implementation 222 of parameter estimator 220 that is configured to calculate at least one value S42 of a parameter of a nonlinear model and a representation S46 of a nonlinear variable of the model. For example, parameter estimator 222 may be configured to calculate the parameter value(s) S42 according to an expression such as (4.4) or (4.5) above.

Figure 18:
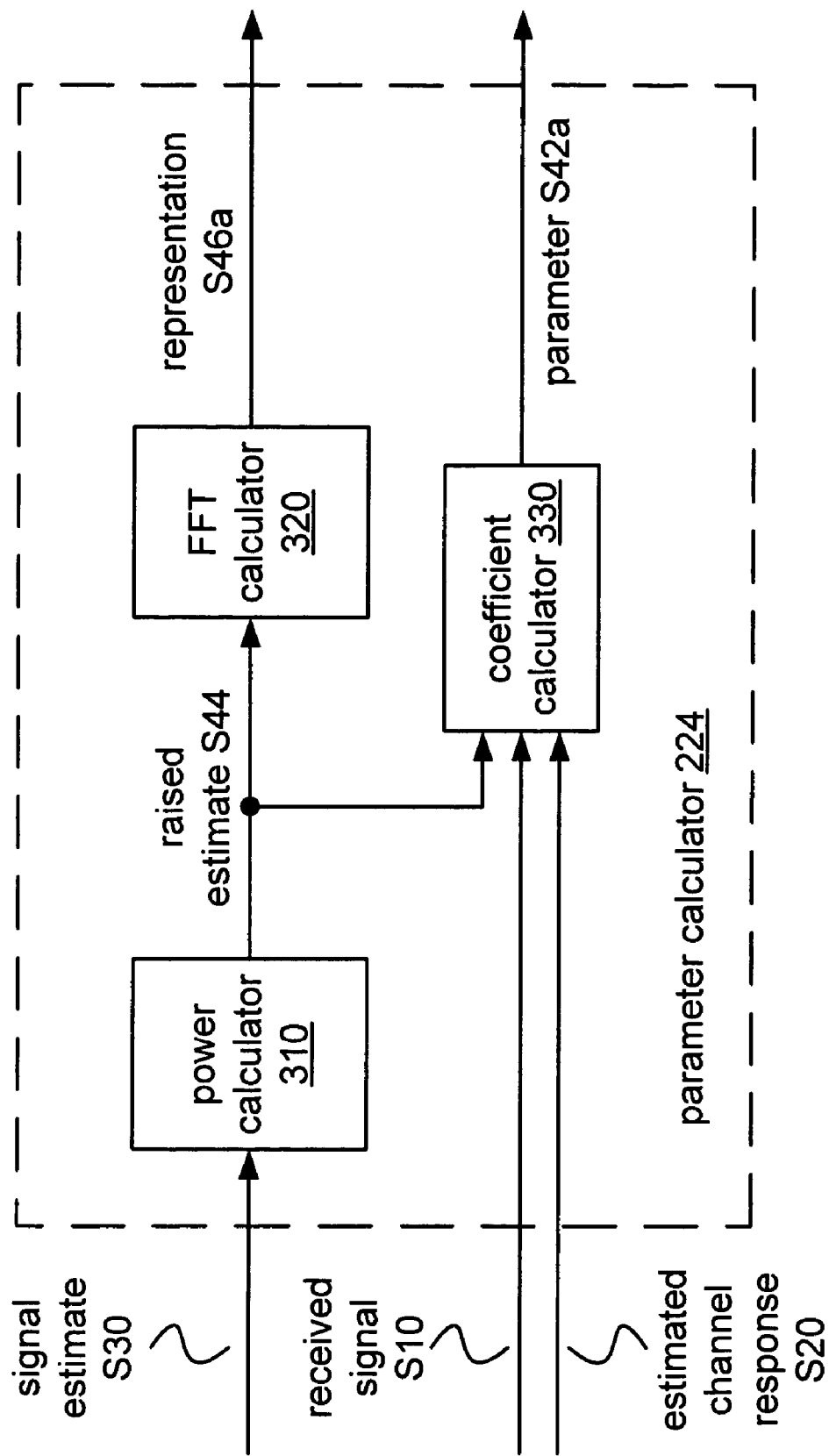
FIG. 18 shows a block diagram of an implementation 224 of parameter estimator 222.

Parameter estimator 222 may be configured to calculate the representation S46 according to an expression such as $\underline{R}=FFT(IFFT[(\underline{s}_1)^n])$, where $\underline{R}$ denotes the representation S46, $\underline{s}_1$ denotes the first estimate, and n denotes the power of the corresponding nonlinear term. FIG. 18 shows a block diagram of an implementation 224 of parameter estimator 222. Power calculator 310 is configured to calculate raised estimate S44 based on signal estimate S30 according to an expression such as $q(k)=[s_1(k)]^n$, where $\underline{q}$ denotes raised estimate S44. FFT calculator 320 is configured to calculate a frequency-domain implementation S46a of representation S46 according to an expression such as $\underline{R}=FFT[\underline{q}]$. Coefficient calculator 330 is configured to calculate an implementation S42a of parameter value(s) S42 according to an expression such as $$a^{(0)} = \frac{1}{P} \sum_{p \in P} \frac{Y(k) - H^{(0)}(p)X(p)}{H^{(0)}(p)R^{(0)}(p)}.$$

Apparatus 102 also includes an implementation 232 of second signal estimator 230 that is configured to calculate an implementation S62 of second estimate S60 based on signal estimate S30, parameter value S42, and representation S46. For example, second signal estimator 232 may be configured to calculate the second estimate S62 according to an expression such as (4.6) or (4.7) above.

As noted above, a method, system, or apparatus according to an embodiment may perform one or more of various methods of channel response estimation. For subcarriers of signal S10 whose transmitted signal is known, for example, task T100 may be implemented to obtain an initial estimate $\underline{H}^i$ of the channel response by dividing the received signal by the corresponding known transmitted signal:

$$H_P^i(k) = \frac{Y(k)}{X(k)}, \text{ for values of } k \text{ in set } P. \quad (6.1)$$

For values of $k\{0, 1, 2, \ldots, M-1\}$ not in set P, task T100 may be configured to include an interpolation operation (in time and/or frequency) to obtain channel response estimates for the corresponding subcarriers. For example, task T100 may be configured to perform a linear interpolation from nearby values for subcarriers in set P. Alternatively, task T100 may perform such an interpolation operation subsequent to one or more further operations (for example, filtering operations as described herein) on values of $\underline{H}^i$ in set P.

Estimate $\underline{H}^i$ may be used as the estimated channel response $\underline{H}^{(0)}$, or a further operation may be performed to obtain $\underline{H}^{(0)}$ from $\underline{H}^i$. For example, it may be desirable to perform a filtering or curve-fitting operation on the estimated channel response, especially for an application in which the time-domain length of the channel response is much less than the number of subcarriers. Implementations of task T100 that obtain a filtered channel response estimate are described herein, and a estimated channel response may be obtained from previous received symbols by using, for example, a predictive process such as a least-mean-squares (LMS) algorithm.

Figure 19A:
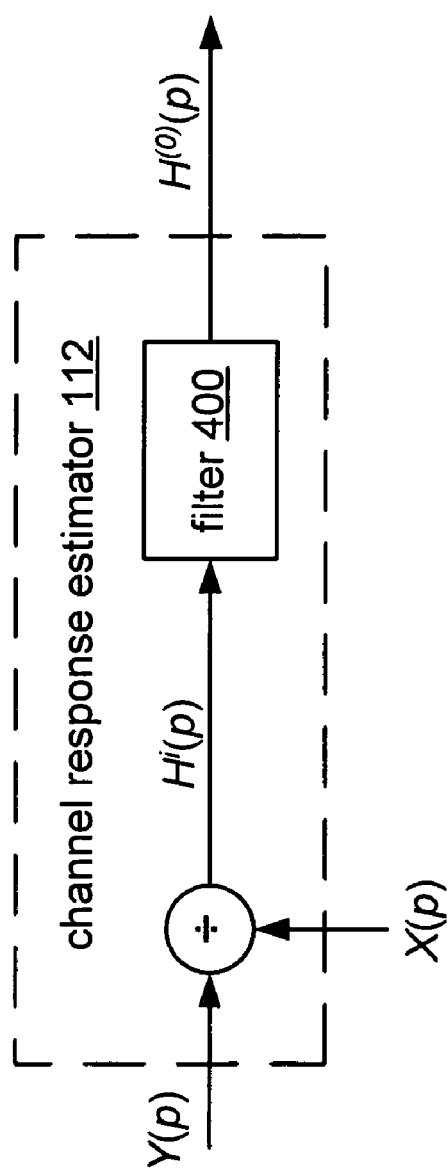
FIG. 19A shows a block diagram of an implementation 112 of channel response estimator 110.

Task T100 may be implemented to obtain a filtered channel response estimate $\underline{H}^{(0)}$ based on an initial estimate $\underline{H}^i$. FIG. 19A shows a block diagram of an implementation 112 of channel estimator 110 that may be used to perform such a task. Channel estimator 112 includes a filter 400 arranged to produce a filtered estimate $H^{(0)}(p)$ from estimate $H^i(p)$ for a carrier $p \in P$. Such an operation may be performed serially and/or in parallel to obtain filtered estimates for other elements of P.

An implementation T102 of task T100 recalculates the channel response estimate by transforming an initial channel response estimate into a different domain, truncating it according to an expected channel impulse response length, and performing an inverse transform on the truncated signal. Such filtering may be especially suitable for a channel whose response varies relatively quickly over time (e.g. from one symbol to the next). In one example, task T102 converts $\underline{H}^i$ to a time-domain sequence $\underline{h}^i$ by taking its inverse discrete Fourier transform:

$$\underline{h}^i = IDFT(\underline{H}^i) = W^H \underline{H}^i, \quad (6.2)$$

where the superscript H indicates the conjugate transpose operation.

Typically, only some of the M values of the transmitted symbol $\underline{X}$ are known a priori (for example, a set P of pilot signals). In such a case, the initial estimate vector $\underline{H}^i$ may only include elements that correspond to those values of $\underline{X}$, and the transform matrix W may be substituted by a reduced matrix $W_p$ that includes only the columns of W that correspond to those elements.

Applying the inverse transform to $\underline{H}^i$ produces an M-element vector $\underline{h}^i$. However, the channel impulse response may be known or assumed to have a length L that is less than M. Thus, it may be assumed that only the first L values of $\underline{h}^i$ are valid, and that the remaining values are noise. Task T102 truncates $\underline{h}^i$ (e.g. to length L) and applies a transform of the truncated vector $\underline{h}^{(o)}$ back into the domain of $\underline{H}^i$ to obtain the channel response estimate $\underline{H}^{(o)}$. In one example, the truncation of $\underline{h}^i$ is performed by applying a reduced transform matrix $W_L$ that includes only the first L columns of W:

$$\underline{H}^{(o)} = DFT(IDFT(\underline{H}^i)) = W_L W^H \underline{H}^i. \quad (6.3)$$

A system or apparatus according to an embodiment may include an implementation of filter 400 configured to perform such an operation. One of skill in the art will understand that the transform matrix (e.g. $W_L W^H$) may be calculated and stored prior to run-time.

Figure 19B:
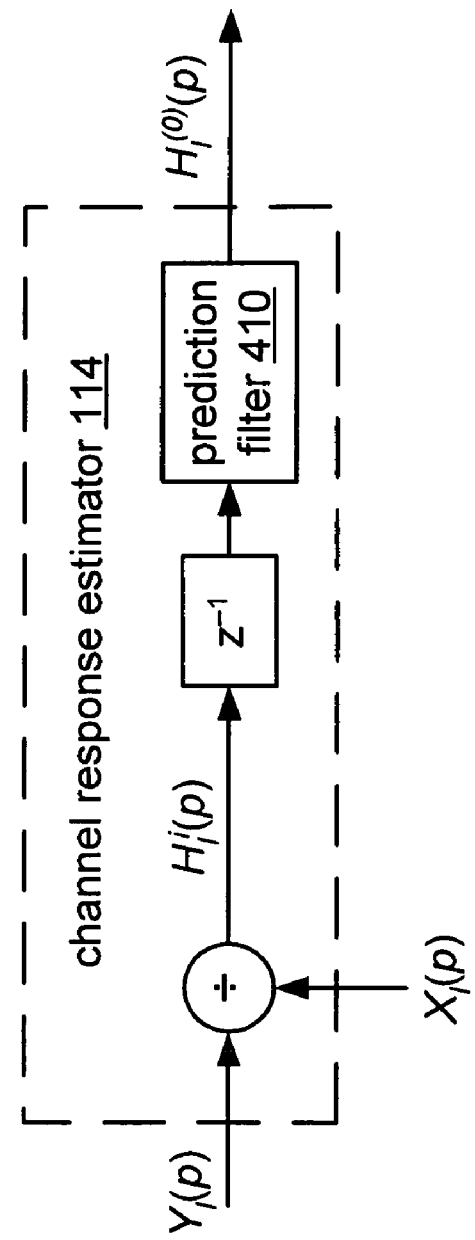
FIG. 19B shows a block diagram of an implementation 114 of channel response estimator 110.

Another implementation T104 of task T100 obtains a channel response estimate $\underline{H}^{(o)}$ based on information received during one or more previous symbol periods. Such filtering may be especially suitable for a channel whose response varies relatively slowly over time (e.g. less than the random noise process from one symbol to the next). FIG. 19B shows a block diagram of an implementation 114 of channel estimator 110. Estimator 114 includes a delay element and a prediction filter 410 that obtains a filtered estimate $H_l^{(o)}(p)$ of the channel response during symbol period l for a carrier p∈P, where $H_l^{(o)}(p)$ is based on one or more estimates $H^i(p)$ corresponding to symbol periods prior to l (and possibly on the current estimate $H_l^i(p)$).

Figure 20A:
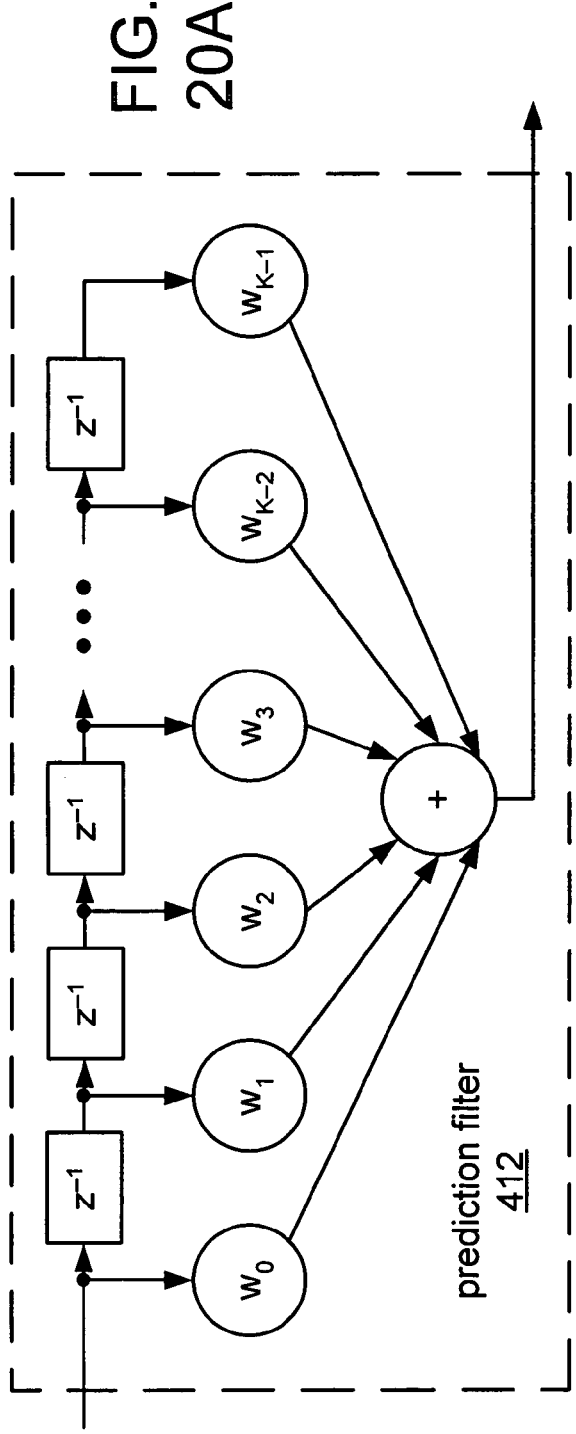
FIG. 20A shows a block diagram of an implementation 412 of prediction filter 410.

Task T104 may be configured to perform a linear prediction. For example, task T104 may obtain a channel estimate based on a sum of weighted values from signals received during previous symbol periods. In some instances (such as on a carrier that carries a continuous pilot), the weighted values may correspond to consecutive symbol periods. In other instances (such as on a carrier that carries a scattered pilot), the weighted values may correspond to symbol periods that are not consecutive (for example, every fourth symbol period). FIG. 20A shows an implementation 412 of prediction filter 410 that calculates a sum of K weighted values of signals received during previous symbol periods. The value of K may be fixed or may be selected based on an expected rate of change in the channel response over time. In one example, the value of K is six.

It may be desired for at least some of the filter weights to be adaptive (e.g. updated periodically and/or upon some event, as opposed to being fixed). For example, the value of a weight may be based on a characteristic of one or more current values of $H^i(p)$ or $H^{(o)}(p)$, one or more past values of $H^i(p)$ or $H^{(o)}(p)$, and/or a channel response estimate from another carrier. In some cases, the value of a weight may be based on an error signal, such as a difference between the current estimates $H_l^i(p)$ and $H_l^{(o)}(p)$.

Figure 20B:
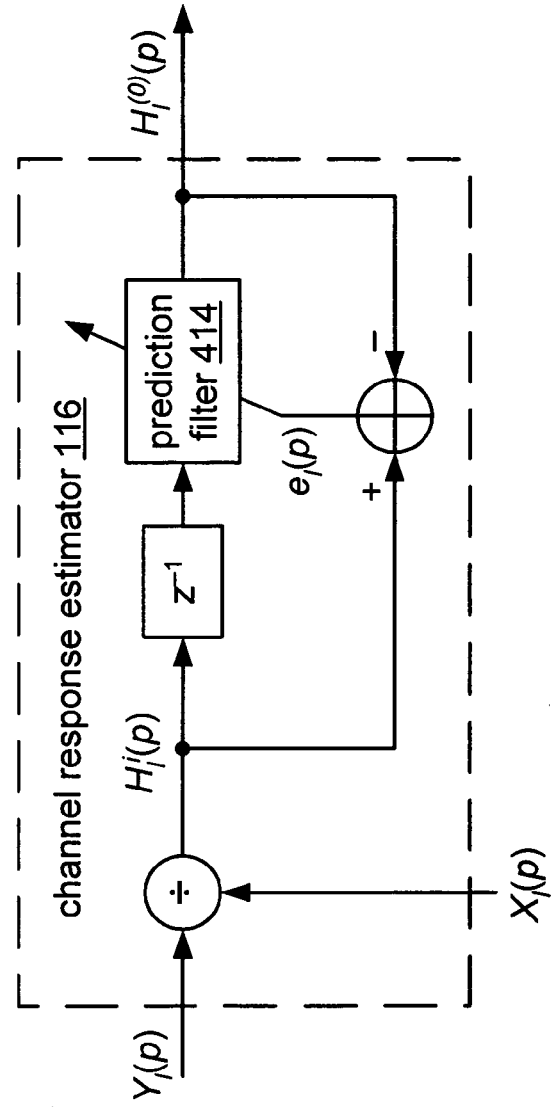
FIG. 20B shows a block diagram of an implementation 116 of channel response estimator 110.

Task T104 may be configured to update a set of filter weights according to an application of a least mean squares (LMS) or steepest-gradient algorithm, such as the following:

$$W_{l+r}(p) = W_l(p) + \mu e_l(p)[H_l^i(p)]^*, \quad (6.4)$$

where $W_l(p)$ denotes the vector of weight values $[W_0, W_1, \ldots, W_{M-1}]$ for symbol period l; $[H_l^i(p)]^*$ denotes the complex conjugate of the corresponding vector of input values to the weights; $e_l(p)$ denotes an error signal with value $H_l^i(p) - H_l^{(o)}(p)$; $\mu$ denotes a step size parameter that may be fixed, selected, or adaptive; and r has value 1 for continuous pilot carriers and 4 for scattered pilot carriers. In another example, task T104 may be configured to apply a related method such as a normalized LMS or recursive LMS algorithm. FIG. 20B shows a block diagram of an implementation 116 of channel estimator 114 in which the values of one or more weights in an implementation 414 of prediction filter 412 may be updated based on such an algorithm.

Figure 21A:
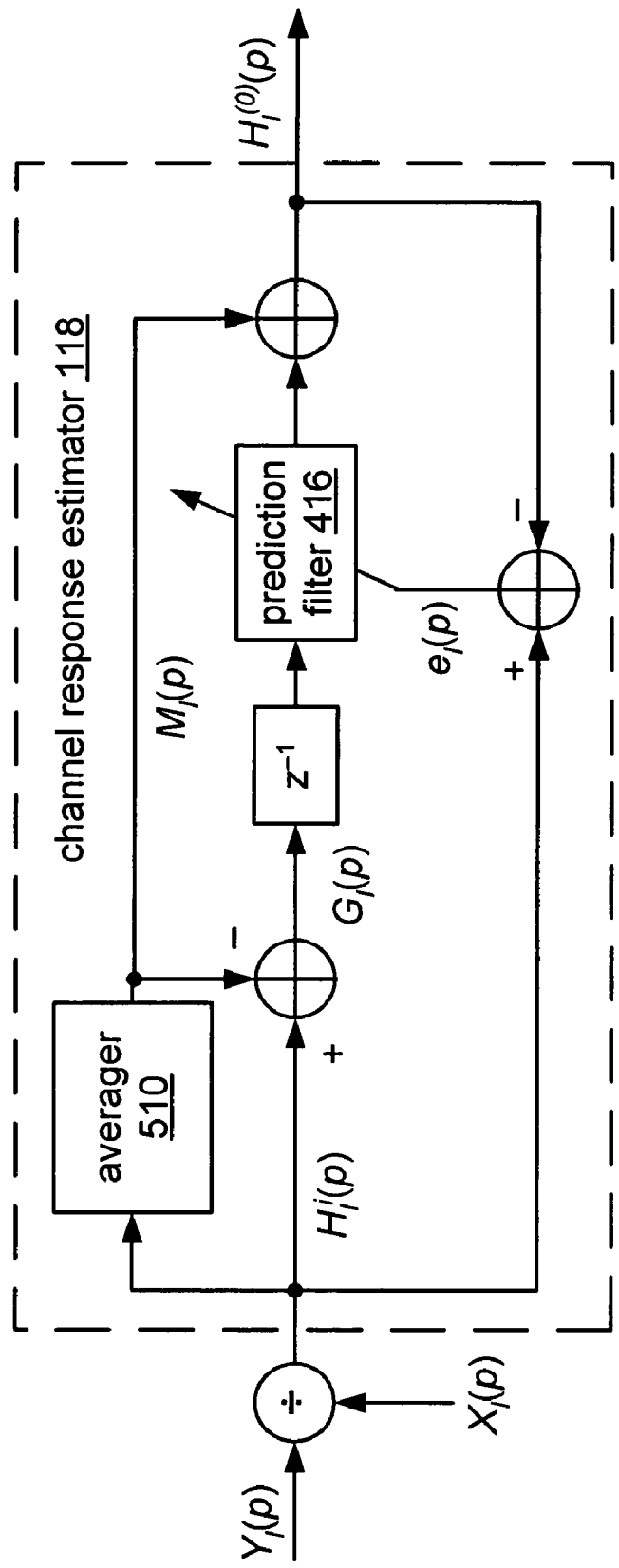
FIG. 21A shows a block diagram of an implementation 118 of channel response estimator 110.

It may be desirable to concentrate the prediction operation upon a portion of the channel response that changes over time. For example, it may be desirable to predict a distance of the current estimate from a mean estimate. FIG. 21A shows a block diagram of an implementation 118 of channel estimator 110 that includes an averager 510 and an implementation 416 of prediction filter 410. Averager 510 may be implemented as a moving averager having a finite impulse response (FIR) based on two or more noisy estimates. For a scattered pilot carrier, averager 510 may produce a mean value according to the following expression:

$$M_{l+r}(p) = \alpha H_l^i(p) + (1-\alpha) H_{l-r}^i(p), \quad (6.5)$$

where $\alpha$ is a weighting factor ($0 \leq \alpha \leq 1$) that may be fixed, selected, or adaptive. Alternatively, averager 510 may be implemented as a decaying integrator having an infinite impulse response (IIR) based on one or more previous states:

$$M_{l+r}(p) = \beta M_l(p) + (1-\beta) H_l^i(p) \quad (6.6)$$

where $\beta$ is a weighting factor ($0 \leq \beta \leq 1$) that may be fixed, selected, or adaptive. In one example, the factor $\beta$ has the value 63/64.

Filter 416 receives a value G that indicates a distance of the current noisy estimate from a mean estimate. In the example of FIG. 21A, the value of $G_l(p)$ is calculated as $H_l^i(p) - M_l(p)$. For a scattered pilot carrier, the values of the weights of filter 416 may be updated according to the following normalized LMS expression:

$$W_{l+r}(p) = W_l(p) + \frac{\mu e_l(p)[G_l(p)]^*}{|G_l(p)|^2}, \quad (6.7)$$

where $G_l(p)$ denotes the vector $[G_{l-r}, G_{l-2r}, \ldots G_{l-Mr}]$ of input values to the weights for carrier p and symbol period l, and r has value 1 for continuous pilot carriers and 4 for scattered pilot carriers.

In some applications (for example, in a very noisy environment), it may be preferred to update the values of the weights based on information from other carriers (such as neighboring carriers). Averaging weight value corrections over a set of carriers (or all carriers) may provide a more robust channel response estimate. In one scattered pilot example, the correction values for the scattered pilot (SP) carriers in P are averaged, and the same weight values are used for all such carriers:

$$W_{l+1} = W_l + \mu \sum_{p \in SP(P)} \frac{e_l(p)[G_l(p)]^*}{|G_l(p)|^2}. \quad (6.8)$$

A similar operation may be applied to obtain a common weight value vector for the continuous pilot carriers in P. It should be noted that although the weights for the scattered pilots are updated every symbol period in this example, it may still be desirable to calculate a new filtered estimate for each such carrier only at every fourth symbol period, corresponding to the appearance of a new pilot signal on that carrier. One of skill in the art will understand that task T104 may also be implemented to obtain a channel response estimate $\underline{H}^{(o)}$ based on information received during one or more subsequent symbol periods (whether in addition to, or as an alternative to, the information received during the one or more previous symbol periods).

An implementation of task T100 as described herein may be applied to scattered pilot carriers to obtain channel response estimates for symbol periods during which pilot signals are transmitted. Such a task may also perform interpolation over time to obtain channel estimates for the carrier during symbol periods between the scattered pilot signals.

Figure 21B:
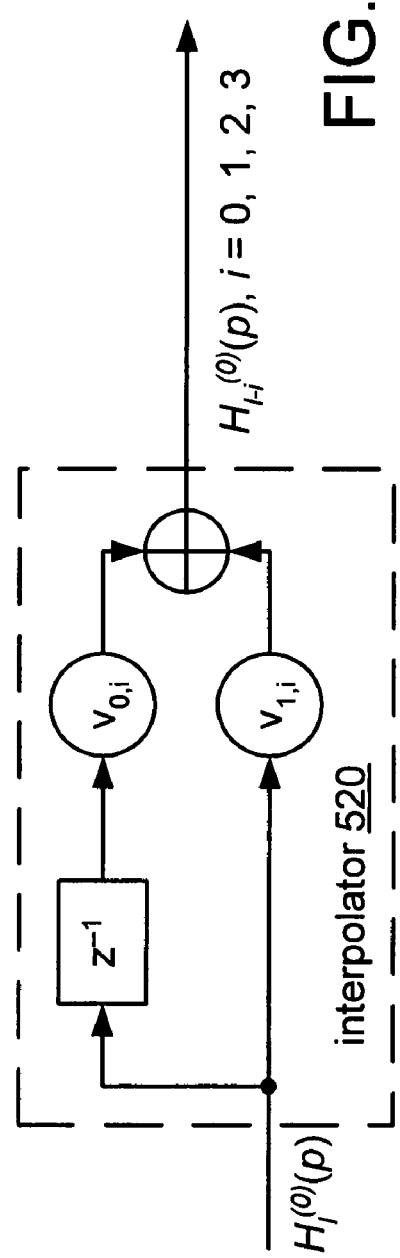
FIG. 21B shows a block diagram of interpolator 520.

FIG. 21B shows a block diagram of an interpolator 520 that calculates estimated channel responses for the three symbol periods preceding the period of the current estimate. In this example, the weights v for this linear interpolator are as follows:

$[v_{0,0}, v_{1,0}] = [0, 1];$ $[v_{0,1}, v_{1,1}] = [1/4, 3/4];$ $[v_{0,2}, v_{1,2}] = [1/2, 1/2];$ $[v_{0,3}, v_{1,3}] = [3/4, 1/4].$

Other implementations of interpolator 520 may apply a nonlinear function (for example, a higher-order polynomial such as quadratic or cubic, or some other function or statistic) and/or perform an interpolation based on more than two estimates.

An implementation of task T100 may further perform an interpolation along the frequency axis to obtain channel estimates for the data carriers. Possible forms of such interpolation range from linear interpolation between the two closest pilot channel estimates to an FIR or IIR interpolation based on more (possibly all) of the available channel estimates for the symbol period. Interpolation of channel response estimates for intermediate pilot and/or data carriers may also be implemented as a two-dimensional (e.g. surface-fitting) operation in time and frequency.

Depending on the particular scheme in which a method or apparatus according to an embodiment is applied, the transmitted power of a pilot component may differ from that of a traffic component. In a DVB system, for example, the power of a pilot carrier is equal to 4/3 the power of a traffic carrier. It may be desirable to account for such a factor in interpolating traffic carrier values, such as estimated channel response values, from pilot carrier values.

Methods and apparatus as described herein may be used to calculate a compensated symbol based on a corresponding received symbol. Such symbol-by-symbol operation may be repeated for each of a received stream of symbols. In the case of channel response estimation, information from previously received symbols may also be used, as described herein. In further implementations of methods and apparatus as described herein, information regarding parameter values corresponding to previous symbols may also be used. Information relating to a nonlinearity in the system (for example, as characterized by one or more parameter values) may also be used by other elements in a system performing an instance of method M100 and/or including an instance of apparatus 100.

Whether and/or how a signal estimation method as described herein is performed (or a signal estimation apparatus as described herein is activated) may be selected depending on other factors in the operating environment, such as one or more characteristics of the received signal and/or a level of available supply power or energy. For example, further embodiments include systems, methods, and apparatus in which one or more tasks and/or elements are activated or deactivated (e.g. further iteration in an implementation of method M100), and/or in which the complexity of one or more tasks or elements is varied (for example, selection among channel estimation methods and/or the number of different parameter values calculated), based on a quality of the received signal such as a detected Doppler frequency. In at least some implementations, such selection may offer advantages of power conservation, which is typically an important concern in battery-operated (e.g. handheld) and heat-transfer-restricted applications.

One or more of the elements of apparatus 100 may be implemented as an array of logic elements such as transistors and/or gates. The elements may be implemented together in one chip or across more than one chip. A chip including one or more such elements may also include arrays configured to perform other processing functions on the received signal such as Viterbi decoding, Reed-Solomon forward error correction, etc.

An implementation of apparatus 100 may be configured using elements having one or more structures to perform corresponding addition, subtraction, multiplication, division, comparison, weighting, and other component mathematical and/or logical operations to support vector, matrix, and other computations and decisions. Such structures may be implemented in hardware, software, and/or firmware. Some or all of such structures or elements may also be shared with other methods and/or apparatus in a device or system.

As noted herein, embodiments may be extended according to a model of the signal as transmitted which includes a higher-order polynomial such as $g(x) = x + ax^3 + bx^5$. Embodiments may also be applied to compensate a nonlinearity in the receiver portion of the transmission path.

The foregoing presentation of the described embodiments is provided to enable any person skilled in the art to make or use the present invention. Various modifications to these embodiments are possible, and the generic principles presented herein may be applied to other embodiments as well. For example, the invention may be implemented in part or in whole as a hard-wired circuit, as a circuit configuration fabricated into an application-specific integrated circuit, or as a firmware program loaded into non-volatile storage or a software program loaded from or into a data storage medium as machine-readable code, such code being instructions executable by an array of logic elements such as a microprocessor or other digital signal processing unit. Thus, the present invention is not intended to be limited to the embodiments shown above but rather is to be accorded the widest scope consistent with the principles and novel features disclosed in any fashion herein.

What is claimed is:

1. A method for estimating a set of data values carried by a received signal, the method performed by a receiver, the method comprising:
   estimating a response of a transmission channel by the receiver, the response estimated at each of a plurality of different carrier frequencies of the received signal;
   calculating a first estimate of a set of data values carried by the received signal by the receiver, the first estimate based on the estimated response of the transmission channel;
   calculating at least one value of a parameter of a nonlinear model of the signal by the receiver, the at least one value based on the first estimate; and
   calculating a second estimate of the set of data values by the receiver, the second estimate based on the calculated parameter.

2. The method according to claim 1, wherein a ratio between the estimated response of the transmission channel at one of the plurality of carrier frequencies and the estimated response of the transmission channel at another of the plurality of carrier frequencies varies over time.

3. The method according to claim 1, wherein calculating the first estimate includes equalizing the received signal according to the estimated response of the transmission channel.

4. The method according to claim 1, wherein calculating at least one value of the parameter includes calculating a value of the parameter of the signal as transmitted.

5. The method according to claim 1, wherein calculating at least one value of the parameter includes calculating a weight of a nonlinear term of the nonlinear model based on the first estimate.

6. The method according to claim 1, wherein the nonlinear model comprises a sum of a linear term and a nonlinear term, and
   calculating at least one value of the parameter includes calculating a weight of the nonlinear term based on the first estimate.

7. The method according to claim 1, further comprising calculating a representation of a nonlinear variable of the nonlinear model of the signal,
   wherein calculating the second estimate is based on the calculated representation.

8. The method according to claim 1, wherein calculating at least one value of the parameter includes calculating a value of a coefficient of a polynomial model of the signal as transmitted based on the first estimate.

9. The method according to claim 8, wherein calculating the value of a coefficient includes calculating a value of a coefficient of a term having an odd-numbered order greater than one.

10. The method according to claim 1, further comprising:
    calculating a time-domain representation of the first estimate; and
    raising the time-domain representation to a power of a nonlinear term of the nonlinear model,
    wherein calculating at least one value of the parameter is based on the time-domain representation.

11. The method according to claim 10, further comprising calculating a frequency-domain representation of the raised time-domain representation, wherein calculating at least one value of the parameter is based on the frequency-domain representation.

12. The method according to claim 10, wherein calculating a time-domain representation includes calculating an estimate of the transmitted signal.

13. The method according to claim 10, wherein calculating the second estimate includes subtracting from the first estimate a set of values based on the frequency-domain representation.

14. The method according to claim 1, wherein calculating the second estimate includes subtracting from the first estimate a set of values based on the at least one value of the parameter.

15. A method for estimating a set of data values carried by a received signal, the method performed by a receiver, the method comprising:
    estimating a response of a transmission channel by the receiver, the response estimated at each of a plurality of different carrier frequencies of the received signal;
    calculating a first estimate of a set of data values carried by the received signal by the receiver, the first estimate based on the estimated response of the transmission channel;
    calculating at least one value of a parameter of a nonlinear model of the signal by the receiver, the at least one value based on the first estimate; and
    calculating a second estimate of the set of data values by the receiver, the second estimate based on the calculated parameter,
    wherein the received signal includes a nonlinearity introduced by an amplifier in the signal path, and
    wherein an effect of the nonlinearity is reduced in the second estimate as compared to an effect of the nonlinearity in the first estimate.

16. The method according to claim 15, wherein calculating at least one value of the parameter includes calculating a weight of a nonlinear term of the nonlinear model based on the first estimate.

17. The method according to claim 15, wherein the nonlinear model comprises a sum of a linear term and a nonlinear term, and
    calculating at least one value of the parameter includes calculating a weight of the nonlinear term based on the first estimate.

18. An apparatus comprising:
    a channel estimator configured to estimate a response of a transmission channel at each of a plurality of different carrier frequencies of a received signal;
    a first signal estimator configured to calculate a first estimate of a set of data values carried by the received signal based on the estimated response of the transmission channel;
    a parameter estimator configured to calculate a value of a parameter of a nonlinear model of the signal based on the first estimate; and
    a second signal estimator configured to calculate a second estimate of the set of data values based on the value of the parameter.

19. The apparatus according to claim 18, wherein a ratio between the estimated response of the transmission channel at one of the plurality of carrier frequencies and the estimated response of the transmission channel at another of the plurality of carrier frequencies varies over time.

20. The apparatus according to claim 18, wherein said parameter estimator is configured to calculate the value of the parameter of the signal as transmitted.

21. The apparatus according to claim 18, wherein said parameter calculator includes:

a power calculator configured to raise a time-domain representation of the first estimate to a power of a nonlinear term of the nonlinear model; and a coefficient calculator configured to calculate a value of the parameter based on the raised estimate.

22. The apparatus according to claim 21, wherein said parameter estimator is configured to calculate a representation of a nonlinear variable of the nonlinear model of the signal, based on the raised estimate, and said second signal estimator is configured to calculate the second estimate based on the calculated representation.

23. The apparatus according to claim 18, wherein said parameter estimator is configured to calculate a value of a coefficient of a term of a model of the signal as transmitted into the transmission channel, and the term has an odd-numbered order greater than one.

24. The apparatus according to claim 18, wherein said second signal estimator is configured to subtract from the first estimate a set of values based on a frequency-domain representation of a nonlinear variable of the nonlinear model of the signal.

25. The apparatus according to claim 18, wherein the signal includes a nonlinearity introduced by an amplifier in the signal path, and said second signal estimator is configured to reduce an effect of the nonlinearity in the second estimate as compared to an effect of the nonlinearity in the first estimate.

* * * * *

UNITED STATES PATENT AND TRADEMARK OFFICE
CERTIFICATE OF CORRECTION

PATENT NO. : 7,583,755 B2  Page 1 of 1
APPLICATION NO. : 11/261614
DATED : September 1, 2009
INVENTOR(S) : Ma et al.

It is certified that error appears in the above-identified patent and that said Letters Patent is hereby corrected as shown below:

ON THE TITLE PAGE

At item (56), OTHER PUBLICATIONS, page 2 (left column), line 5, before the words "power amplifiers" delete "nonoinear" and insert therefor --nonlinear--.

IN THE SPECIFICATION

At column 2, line 44, after the words "diagram of" delete "a SSPA model for constants" and insert therefor --an SSPA model for constant p--.

At column 6, delete expression (2.1) and insert therefor --$g(x) = F(p)e^{j(\phi + \Phi(p))}$,--.

At column 9, line 14, after the word "symbol" delete "X" and insert therefor --$\underline{X}$--.

At column 12, lines 3 and 4, delete expression (5.7) and insert therefor
--
$$X_3^{(v)} = FFT[(IFFT[\underline{X}^{(v)}])^8], H^{(v)}(k) = \frac{Y(k)}{X^{(v)}(k) + \alpha^{(v)}X_j^{(v)}(k)}.$$
--.

At column 13, line 61, after the words "such as" delete "q(k)=[s₁(k)]ⁿ," and insert therefor --$\underline{q}(k)=[s_1(k)]^n$,--.

IN THE CLAIMS

In claim 21, at column 20, line 67, replace "calculator" with --estimator--.

Signed and Sealed this

Eighth Day of December, 2009

David J. Kappos
*Director of the United States Patent and Trademark Office*